(12) United States Patent
Salander et al.

(10) Patent No.: US 7,588,146 B1
(45) Date of Patent: Sep. 15, 2009

(54) COMPUTER CASE

(75) Inventors: Mark T. Salander, Barrington, RI (US); Richard C. Bellofatto, Peabody, MA (US); Quincy Reese, Boston, MA (US)

(73) Assignee: The Gem Group, Inc., Lawrence, MA (US)

( * ) Notice: Subject to any disclaimer, the term of this patent is extended or adjusted under 35 U.S.C. 154(b) by 0 days.

(21) Appl. No.: 12/168,712

(22) Filed: Jul. 7, 2008

(51) Int. Cl.
*B65D 85/00* (2006.01)
(52) U.S. Cl. ................ 206/320; 190/110; 190/112
(58) Field of Classification Search ........... 206/320, 206/576, 701, 316.1, 804; 190/109, 110, 190/111, 112, 900
See application file for complete search history.

(56) References Cited

U.S. PATENT DOCUMENTS

| | | | | |
|---|---|---|---|---|
| 6,654,235 | B2 * | 11/2003 | Imsand | 361/679.09 |
| 6,994,194 | B2 * | 2/2006 | Smith | 190/111 |
| 2004/0262111 | A1 * | 12/2004 | Ghiassi | 190/103 |
| 2005/0098402 | A1 * | 5/2005 | Cohen | 190/12 A |
| 2007/0228097 | A1 * | 10/2007 | Recanati | 224/580 |
| 2009/0008202 | A1 * | 1/2009 | Dayton et al. | 190/100 |

\* cited by examiner

*Primary Examiner*—Jacob K Ackun, Jr.

(74) *Attorney, Agent, or Firm*—William A. Loginov; Loginov & Associates, PLLC

(57) ABSTRACT

This invention provides a case system that removably stores a laptop computer so that it can be removed normally through the top of the case when needed, but also through a flap formed in the side of the case while residing upon a tray with retention lips on at least three sides. The case can be a briefcase, messenger bag or backpack, among other styles. The tray edge facing the top opening is free of any lip or raised obstruction to allow laptop removal from the case through a conventional top flap. The tray is withdrawn/slid from the side of the case unzipping and opening the side flap. The tray is tethered to the case interior so that it extends only slightly beyond the adjacent edge of the case. In this manner, the tray/laptop is prevented from excess rotational movement (e.g. jackknifing) with respect to the case. The tray is free of any x-ray opaque structures or materials, thereby allowing an unobstructed scan to be performed on the laptop. A zipper pull, a fabric loop structure formed adjacent to the side flap, and/or the side flap itself an indicia that clearly indicates regulatory approval of the case. Alternatively, a case is provided, having a central zipper that extends along three side edges along its midline thickness allows it to be opened, clamshell-like into two opposing halves. The laptop is enclosed within one of the halves. The lips prevent excursion of the laptop from the case half as it moves through the scanner. The laptop-containing half omits metallic or other x-ray-opaque structures that would overlie or underlie the laptop. Likewise, as required no obstructions of any kind overlie the laptop. The case of this embodiment can include appropriate indicia indicating regulatory approval.

17 Claims, 23 Drawing Sheets

COMPUTER CASE

FIELD OF THE INVENTION

This invention relates to carrying cases for portable and/or "laptop" computers.

BACKGROUND OF THE INVENTION

Portable computers, also commonly termed laptops, have become essential business tool, and are widely used by the public. The clear advantage of a laptop computer is its portability. Because laptop computers are valuable, somewhat delicate and afford a convenient way to pass time while traveling, they are typically carried on the person of an individual as he or she boards a vehicle, such as a train, bus or airplane. During the trip, the user may employ his or her laptop, in order to conduct personal or business computing activities.

However, recent security concerns, particularly with respect to airplanes, require that laptops be subjected to enhanced scrutiny before an individual is allowed to board a vehicle with the laptop in his or her baggage. In most jurisdictions, this scrutiny includes, at a minimum, scanning the laptop with an x-ray scanner that allows security personnel to detect any abnormalities within the computer case. Such abnormalities may suggest the possibility weapon or dangerous device contained therein.

In the United States, security at airports (and potentially other travel facilities) is administered by the Transportation Safety Administration (TSA). The TSA promulgates various requirements and procedures by which searching of travelers and their baggage is carried out. At present, the TSA requires that all laptop computers, and other like computing devices, be removed from their case and deposited in a predetermined basket or tray. FIG. 1 thus illustrates the current TSA procedure with respect to laptop computers. As shown, a conveyor 110 is provided for passengers to deposit their carry-on items as they pas through a security checkpoint. The conveyor 110 directs items through an opening 112 at the front end of an x-ray scanner 120, or similar scanning device. A display 130 is projected to security personnel so that they can view the internal structure of the scanned items. As shown, an exemplary laptop computer 140 has been placed in an individual bin 142. Likewise, the partially opened case 150 that normally contains the laptop 140 is placed in a separate bin 152. The TSA requires that the laptop 140 be completely separated from the case 150 so that no underlying bag contents, zippers, clasps, buckles, etc., will appear in the laptop's scan image. In this manner, the image more accurately represents the complicated laptop internals.

Of course, the requirement to separate the laptop from the case is an added inconvenience for passengers and makes the process of security screening more time-consuming. Extra time is required for the passenger and/or security personnel to gather multiple bins, separate the laptop from the case, place each item properly into a bin, await scanning, remove each item from its respective bin and repack the laptop in the case.

It is, therefore, desirable to provide a system for allowing easy removal of the laptop in a manner that does not require complete separation of it from the case. In such an arrangement, the laptop should be contained against slippage off the conveyor belt, while being fully exposed for scanning with no overlying obstructions or underlying structures that would obscure the x-ray scan. This system should be applicable to a variety of types of portable laptop enclosures including standard cases, messenger bag-style cases, backpacks, and the like.

SUMMARY OF THE INVENTION

This invention overcomes the disadvantages of the prior art by providing a case system that removably stores a laptop computer so that it can be removed normally through the top of the case when needed, but also through a flap formed in the side of the case while residing upon a tray with retention lips on at least three sides. The edge facing the top opening is free of any lip or raised obstruction to allow laptop removal from the case through a conventional top flap. The tray can be slid from the side of the case unzipping and opening the side flap. The tray is tethered to the interior of the case so that it extends only slightly beyond the adjacent edge of the case. In this manner, the tray/laptop is prevented from excess rotational movement (e.g. jackknifing) with respect to the case. The tray is constructed from a lightweight, x-ray-transparent material such as a high-density EVA foam. More particularly, the tray is free of any x-ray opaque structures or materials, thereby allowing an unobstructed scan to be performed on the laptop. The tether can comprise a piece of non-elastic webbing, and the side flap can be secured by a zipper enclosure that extends along three sides of the side flap, the fourth side being the hinge side. In an illustrative embodiment, a zipper pull (for example the side flap's pull), a fabric loop structure formed adjacent to the side flap, and/or the side flap itself can include a predetermined color, marking or other indicia that clearly indicates regulatory approval of the case as one in which the laptop need not be completely detached from the case, but rather slid out on its tethered tray. The case can have a variety of styles and shapes. In one embodiment it is a soft briefcase-style. In another embodiment the case is a messenger bag-style with an overlying, extended flap that rests partially along the side. The flap includes a top side that can be secured to the case body by a separate three-sided zipper closure (the rear side being a hinge without zipper). The tray includes a top edge that is lip-free so that the laptop can be normally withdrawn through the top opening when the flap is unzipped and completely hinged over. In yet another embodiment, the case is a backpack. The backpack includes a separate rear compartment that confronts the side flap. The backpack's front compartment can include a rear wall that also forms the front wall of the rear laptop compartment. A peripheral zipper around the sides and top of the backpack allows the front compartment and rear compartment to be separated to expose the rear compartment and tray. The tray is also free of a lip on the top side, allowing the laptop to be withdrawn through the opened top. In each embodiment, there is a side opening that allows the tethered tray to be withdrawn for scanning/inspection, as well as a conventional opening through which the laptop is over an associated lipless edge on the tray.

In an alternate embodiment a case having a central zipper that extends along three side edges along the midline of the case's thickness allows it to be opened, clamshell-like into two opposing halves, and laid flat with the halves spread apart. When open, the laptop is enclosed within one of the halves. This half of the case includes three upright lips, formed typically from fiber-filled or foam-filled fabric that can be semi-flexible. The lips prevent excursion of the laptop from the case half as it moves through the scanner. The laptop-containing half is free of any metallic or other x-ray-opaque structures that would overlie or underlie the laptop. Likewise, as required no obstructions of any kind overlie the laptop. The case of this embodiment can include appropriate indicia indicating regulatory approval.

BRIEF DESCRIPTION OF THE DRAWINGS

The invention description below refers to the accompanying drawings, of which.

DETAILED DESCRIPTION

Figure 2:
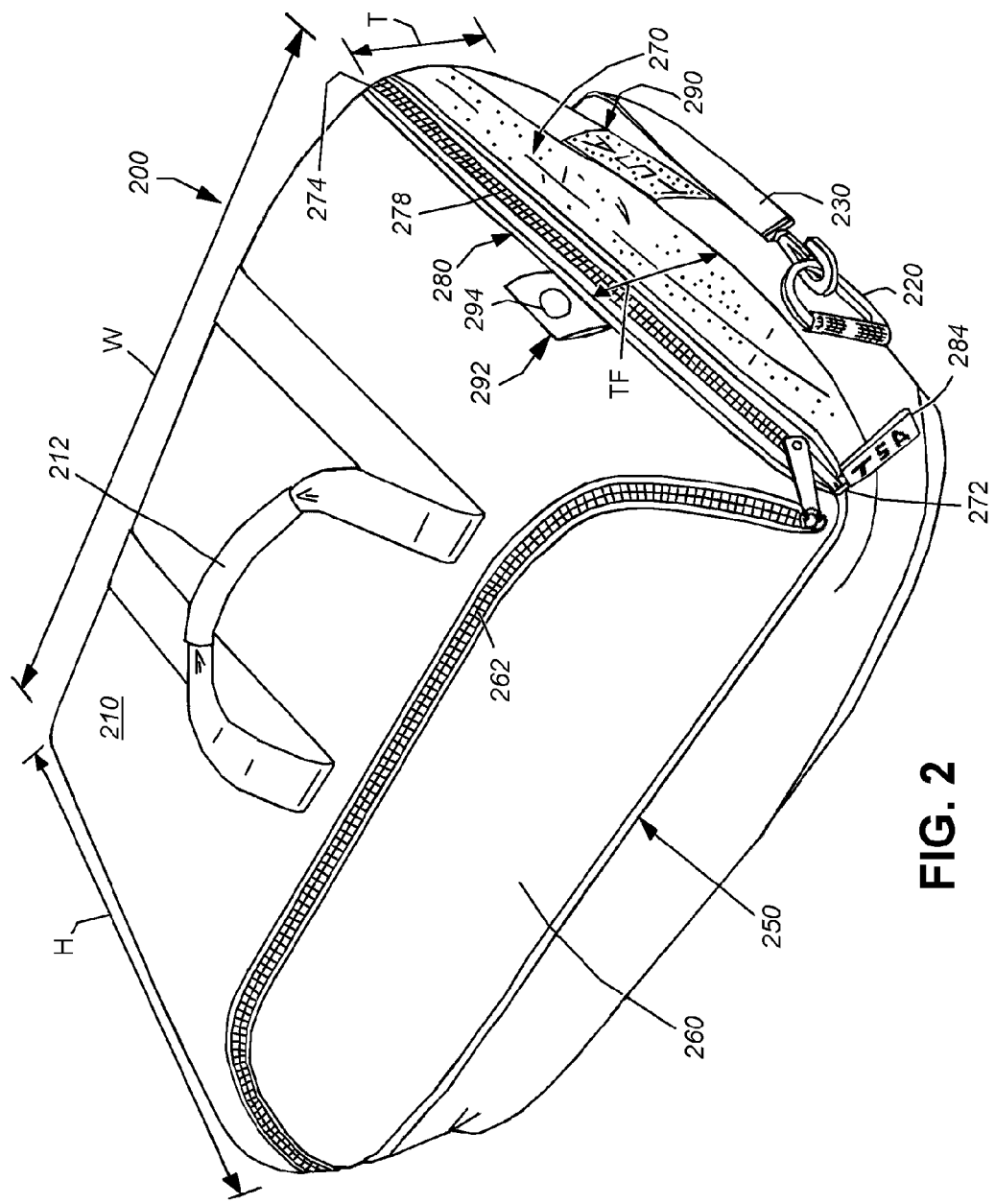
FIG. 2 is a perspective view of a computer case showing a top pocket and a novel side pocket and pull-out tray according to an illustrative embodiment of this invention.

A computer case 200 according to an embodiment of this invention is shown in FIG. 2. The case is sized generally similar to other conventional cases for holding laptop and/or portable computing devices (herein termed simply a "laptop") of a certain size and form factor. In one embodiment, the outer dimensions for height H, width W and thickness T are approximately 12 to 14 inches, 16 to 18 inches and 4 to 6 inches, respectively so as to enclose a conventional 17-inch wide-screen laptop. However, the case can be dimensioned appropriate to fit any particular size, shape or style of laptop in alternate embodiments. Note, as used herein the term "case" shall refer generally to any style of enclosure that enables a user to transport and/or protect a laptop computer or other portable computing/electronic device. As such a case can include the briefcase style depicted in FIG. 2, or alternate styles including, but not limited to, messenger bag-style cases and backpacks as described below. While such cases are typically soft-sided, this invention expressly contemplates that the principles described herein can also be applied to rigid or semi-rigid constructions in alternate embodiments.

As described above, the case 200 includes internal padding to appropriately protect the enclosed laptop. The front face 210 of the case includes a reinforced handle 212 that extends from the top corner of the case. The rear face can include a similarly sized and positioned handle, which is not shown so as to allow for easy carriage of the case. Note, as used herein directional terms, such as "front", "rear", "top", "bottom" and "side" should be taken as conventions, only to describe relative parts of the case. For the purposes of the description, these conventions are based upon a case that is standing up in a manner shown, for example, in FIGS. 8 and 9 (described below). A D-ring 220 is provided on each opposing side of the case near the top edge. This D-ring allows attachment of an appropriate shoulder strap 230 that can be adjustable in a conventional manner to achieve different lengths. Extending from the top edge 250 along a portion of the front face 210 is a top flap 260 and associated zipper closure 262. Note that the closure 262 defines a somewhat arcuate path along the front face between the two opposing corners of the top edge 250. This flap 260, termed the "top flap" herein, allows for conventional access of the enclosed laptop as is also shown and described below.

Figure 7:
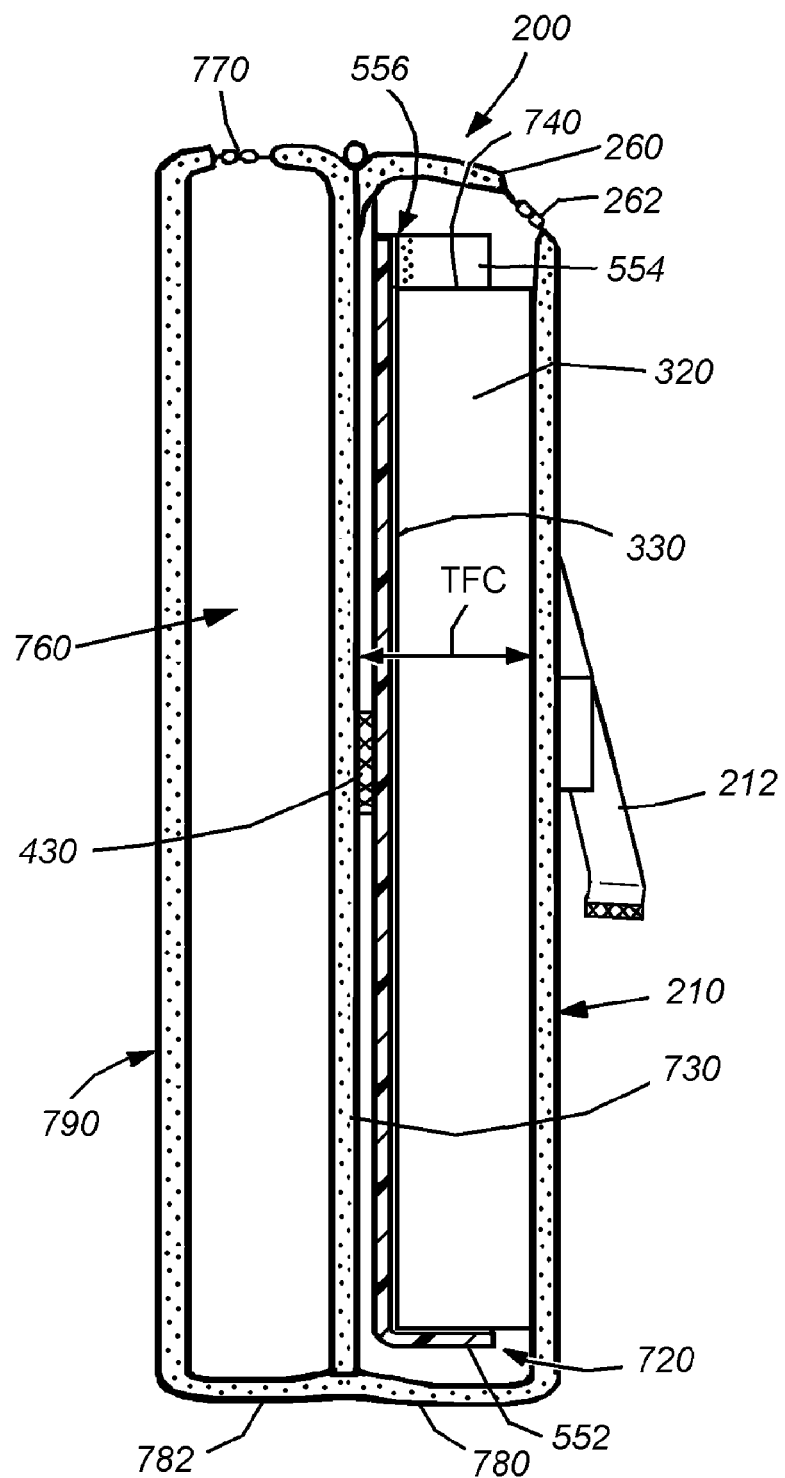
FIG. 7 is a side cross section of FIG. 2 with the case with in laptop and tray installed therein.

Notably, a side flap 270 is provided along one of the side edges of the case. The side flap 270 extends from the top corner 272 to the bottom corner 274 of the associated side and has a span TF along the thickness of the side that is less than the overall thickness T of the side. In one embodiment, the thickness TF can be approximately one-half the overall thickness. In this manner the side flap covers one of a pair of adjacent compartments within the case (discussed with reference to FIG. 7 below). The side flap 270 is accessed by a zipped closure 278 that also runs between the corners 272 and 274 along an edge or seam 280 of the case that defines an approximate corner between the front face 210 and the side of the case 200.

Figure 3:
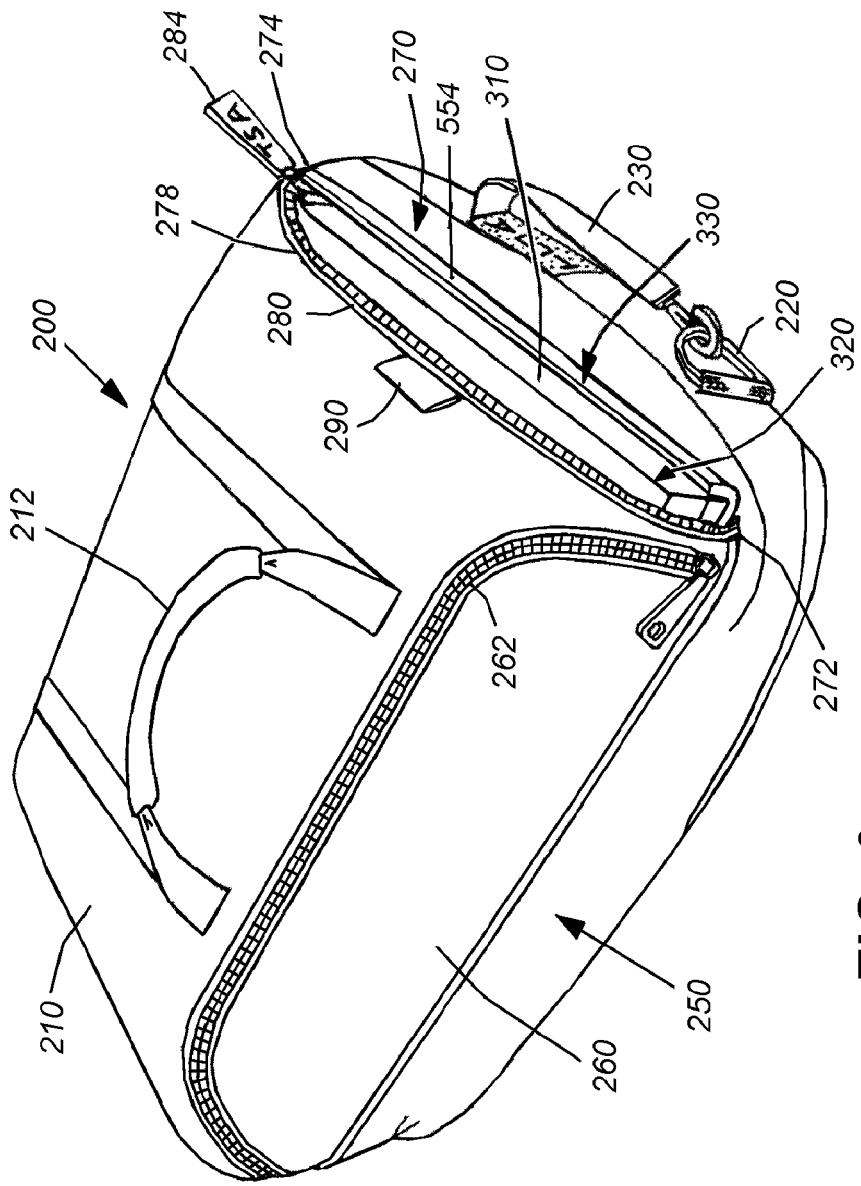
FIG. 3 is a perspective view of the case of FIG. 2 showing a side pocket being opened to reveal the laptop and underlying pull-out tray for containing the laptop.
Figure 4:
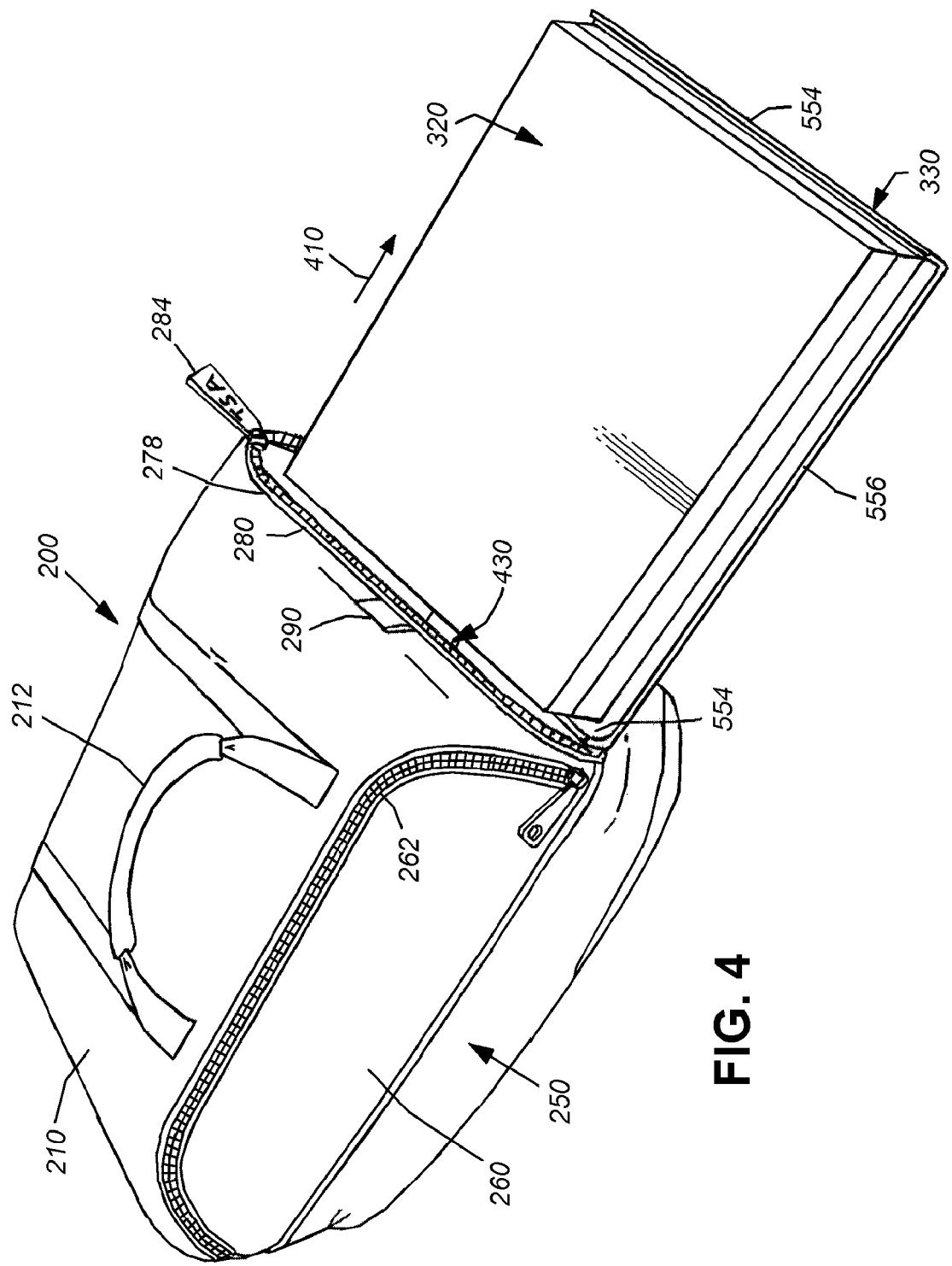
FIG. 4 is a perspective view of the case in of FIG. 2 showing the laptop with tray fully extracted from the side pocket for inspection by the scanning system.

With further reference to FIGS. 3 and 4, the side flap 270 is opened by moving the zipper pull 284 across the flap from a closed position to an opened position. The opened position is shown more particularly in FIG. 3. When opened, the side flap 270 reveals the side edge 310 (being the narrower side of a rectangular shape) of an exemplary laptop computer 320. As shown, the laptop 320 is contained within an underlying tray structure 330. This tray 330 is constructed from high-density polymer foam (for example, EVA foam) or another x-ray-transparent material that exhibits rigid or semi-rigid properties. The tray 330 is free of metal fittings or other x-ray-opaque items/structures. When the laptop 320 and tray 330 are exposed through the side opening, they can be grasped by the user and slid outwardly from the side of the case 200 as a group as indicated by the arrow 410 in FIG. 4. The dimensions of the side opening defined by the side flap's zipper closure 278 are, of course, sufficient to allow the tray 330 and laptop 320 to be slid out of the case relatively free of any obstruction thereby. With the laptop 320 and tray 330 withdrawn, the flap 270 simply hinges below tray so as to avoid obstructing its withdrawal (arrow 410).

Figure 5:
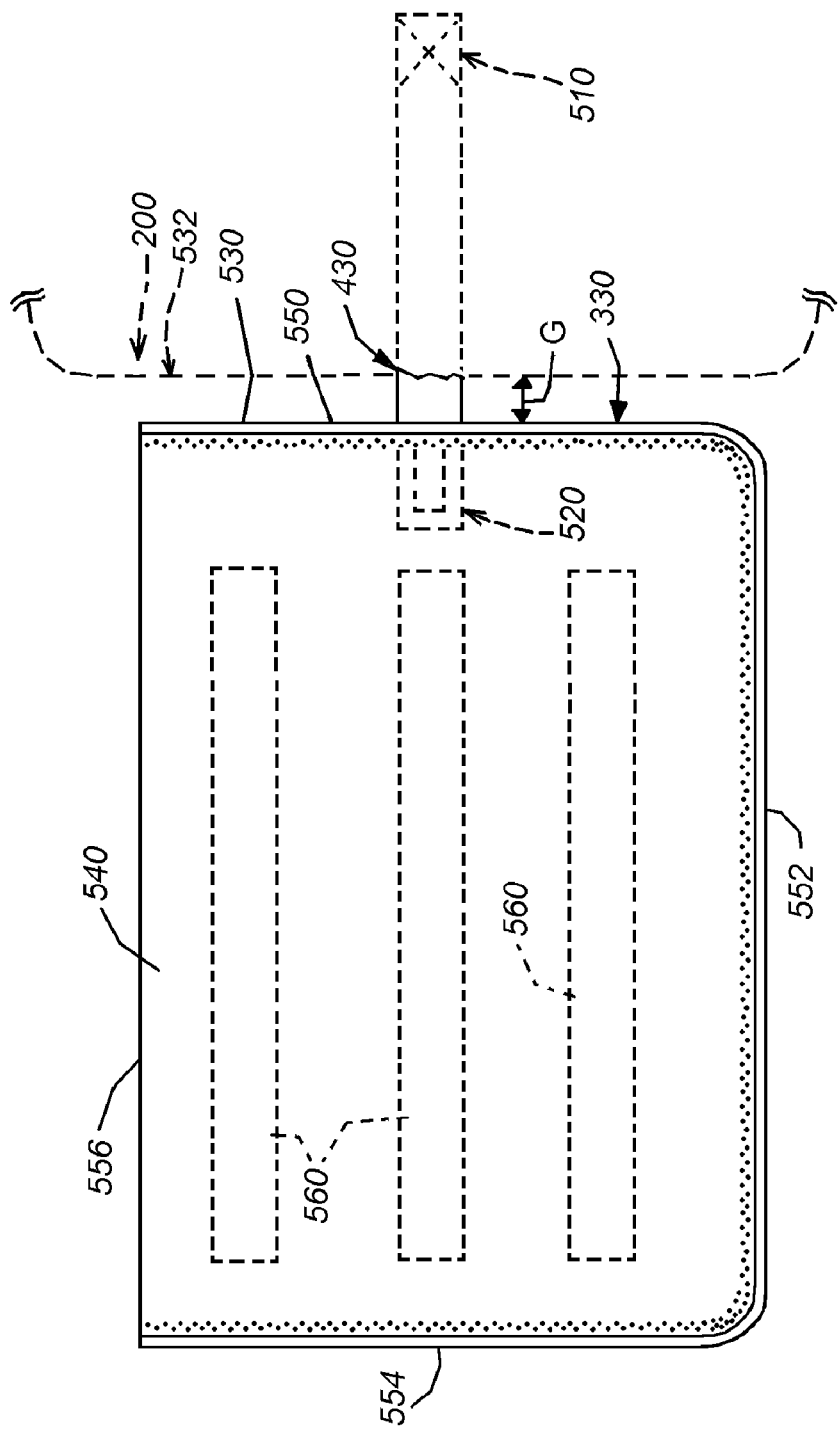
FIG. 5 is a simplified top view of the tray for containing the laptop and attached case tether.

The distance of extension of the tray 330 and laptop 320 out of the case is limited. This is accomplished using a connecting strap or tether 430. The tether 430 is anchored inside the computer compartment of the case 200 as shown by the anchor point 510 (in phantom) in the top view of FIG. 5. The opposing end of the tether 430 is attached to the base of the tray 330 at the anchor point 520 (also shown in phantom). The tether 430 can be a non-elastic webbing having a width of between one and two inches. The choice of the tether's material and its dimensions are highly variable. In general, the anchor point 510 is positioned within the compartment at a location therein that is approximately one-half the total width (W in FIG. 2) of the case so that, when extended as shown in FIG. 5, the adjacent edges 530 and 532 of the tray 330 and case 200 only slightly separated from each other—for example, defining a gap G of between approximately ¼ inch and 1 inch. According to this embodiment the tether 430 thereby allows the tray to be withdrawn fully out of the case, but not so far away from the case that the tray will exhibit substantial rotation with respect to the side edge 532 of the case. In other words, the tray 330 is free from excessive jackknifing as it moves along a conveyor belt and through a security scanner. The width and thickness of the tether 430 may also help to prevent jackknifing, as a wider, thicker and/or stiffer tether resists buckling better.

As also shown in FIG. 5, the tray includes a base plate 540 surrounded by three raised edges or lips 550, 552 and 554 along the opposing side edges and bottom edge. The top edge 556 is free of any raised structure or lip. The lips 550, 552, 554 have a height of between approximately ¼ and 1 inch. This height is highly variable in alternate embodiments. In this embodiment, the lips 550, 552, 554 are arranged so as to closely surround a typical-sized 17-inch screen laptop. Of course, smaller laptops can be contained within the edges but will have more room to freely move within the tray. Larger laptops may require a larger trace and associated tray constructed according to an embodiment of this invention. The tray's base plate 540 can include molded-in raised ribs 560 (shown in phantom) or other projecting structures that can increase the stiffness of the tray, aid in shock-absorption (i.e. an egg-crate effect), increase ventilation with respect to the laptop bottom, and otherwise provide ornamental accents. The interior surface of the tray 330, which faces the laptop, is provided with pile or other softened material to prevent scuffing of the laptop and provide an aesthetically pleasing surface. The surface detail of either side of the tray 330 is widely variable in alternate embodiments.

Figure 6:
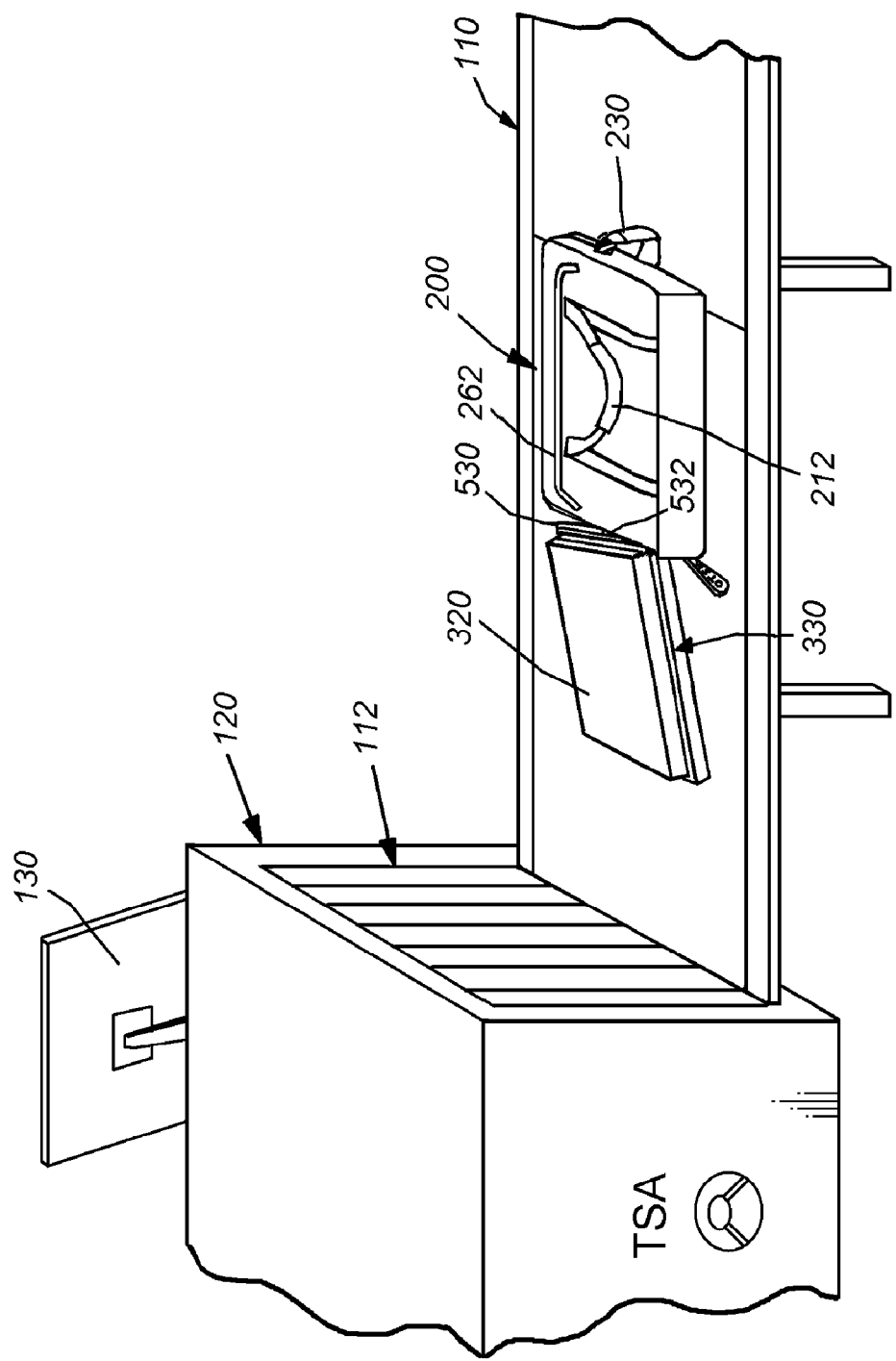
FIG. 6 is an illustration of the case of FIG. 2 with laptop and tray removed through the side opening and being directed down the conveyor of an exemplary x-ray scanning system.

Use of the case 200 at a transportation security checkpoint is shown in FIG. 6. As depicted, the side flap 270 of the case has been opened by a user, by unzipping the flap 270, and the tray 330 has been withdrawn sideways with the laptop 320 contained thereon to a fully extended/withdrawn position with respect to the case 200. The tether 430 prevents the user from withdrawing the tray 330 beyond a predetermined point wherein the tray edge 530 is barely separated from the case's adjacent edge 532. Thus, the tray 330 is now effectively separated from the case and no case components overlie or underlie the laptop 320 other than the x-ray-transparent tray 330 itself. The user deposits the extended tray/laptop 330, 320 and case 200 on the conveyor 110. The tray/laptop 330, 320 then move through the above-described scanner 120, where they will each be scanned in accordance with the requirement that the laptop be separated from any case or any other item. The close conformance of the case 200 and the tray 330 provided by the tether 430 insures that the items will not be skewed as they pass through the scanner. At the opposing end of the scanner, once the security check is completed, the user simply slides the tray 330 and laptop 320 back though the side opening, and zips closed the side flap 270. Thus, the novel case of this invention has reduced a multi-step and cumbersome process into two easy beginning steps (unzip and slide out) and two easy ending steps (slide in and zip).

Figure 1:
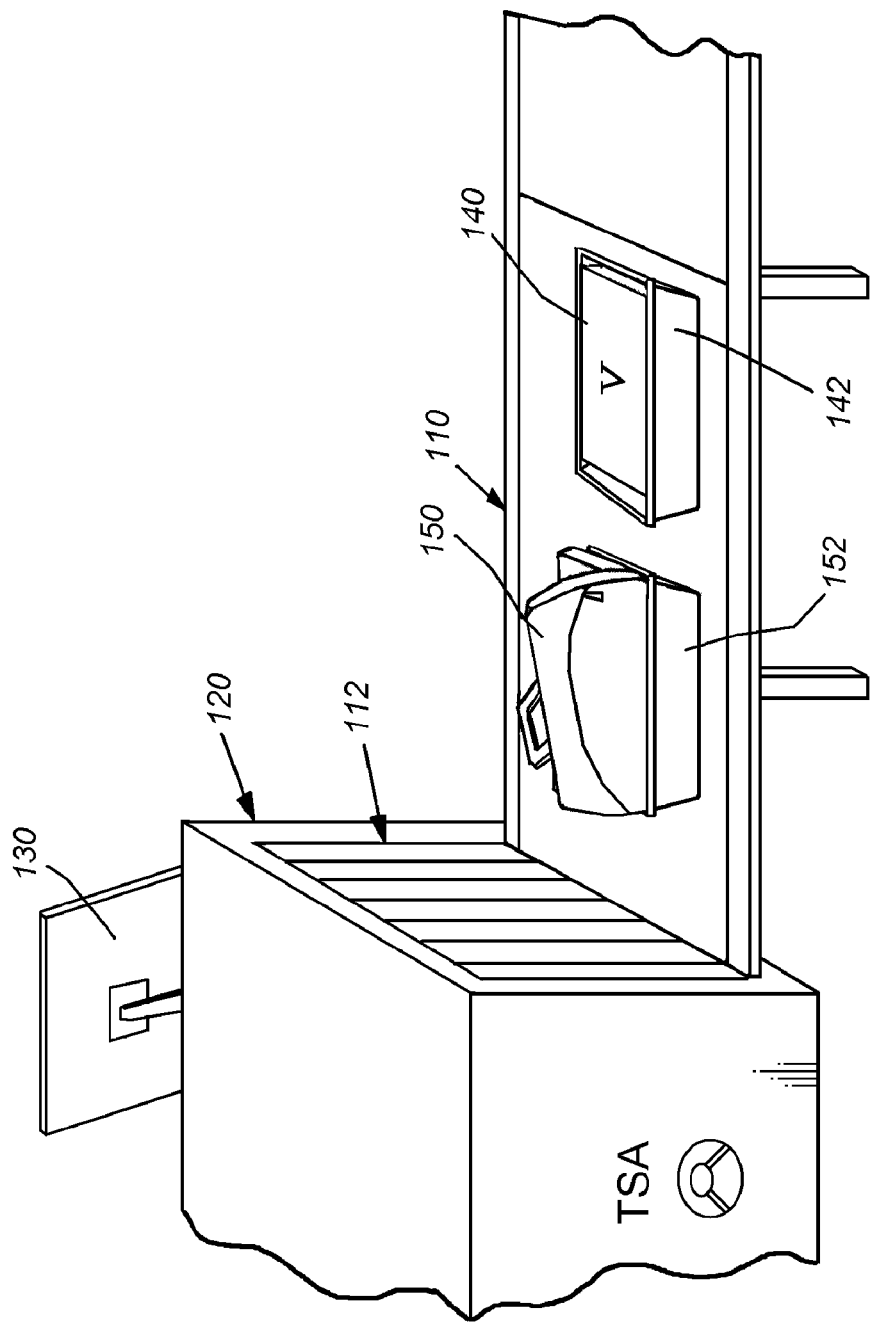
FIG. 1 is, already described, is an illustration of a typical security-screening process for a laptop and associated case employing an x-ray scanner according to the prior art.
Figure 8:
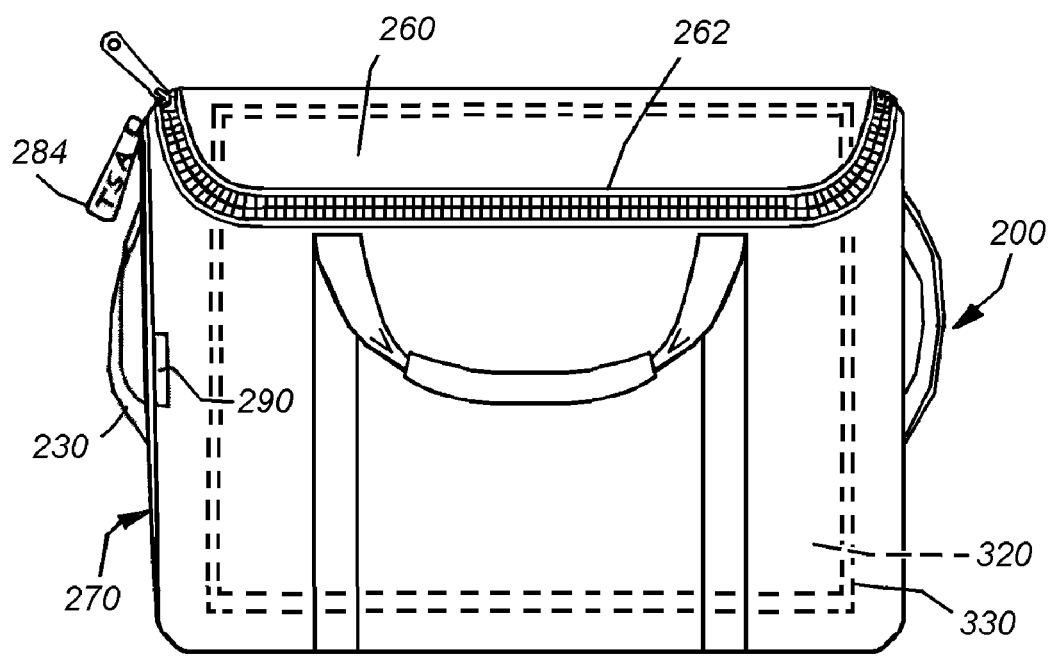
FIG. 8 is front view of the case of FIG. 2 showing the laptop stored therein with the top flap zipped closed.
Figure 9:
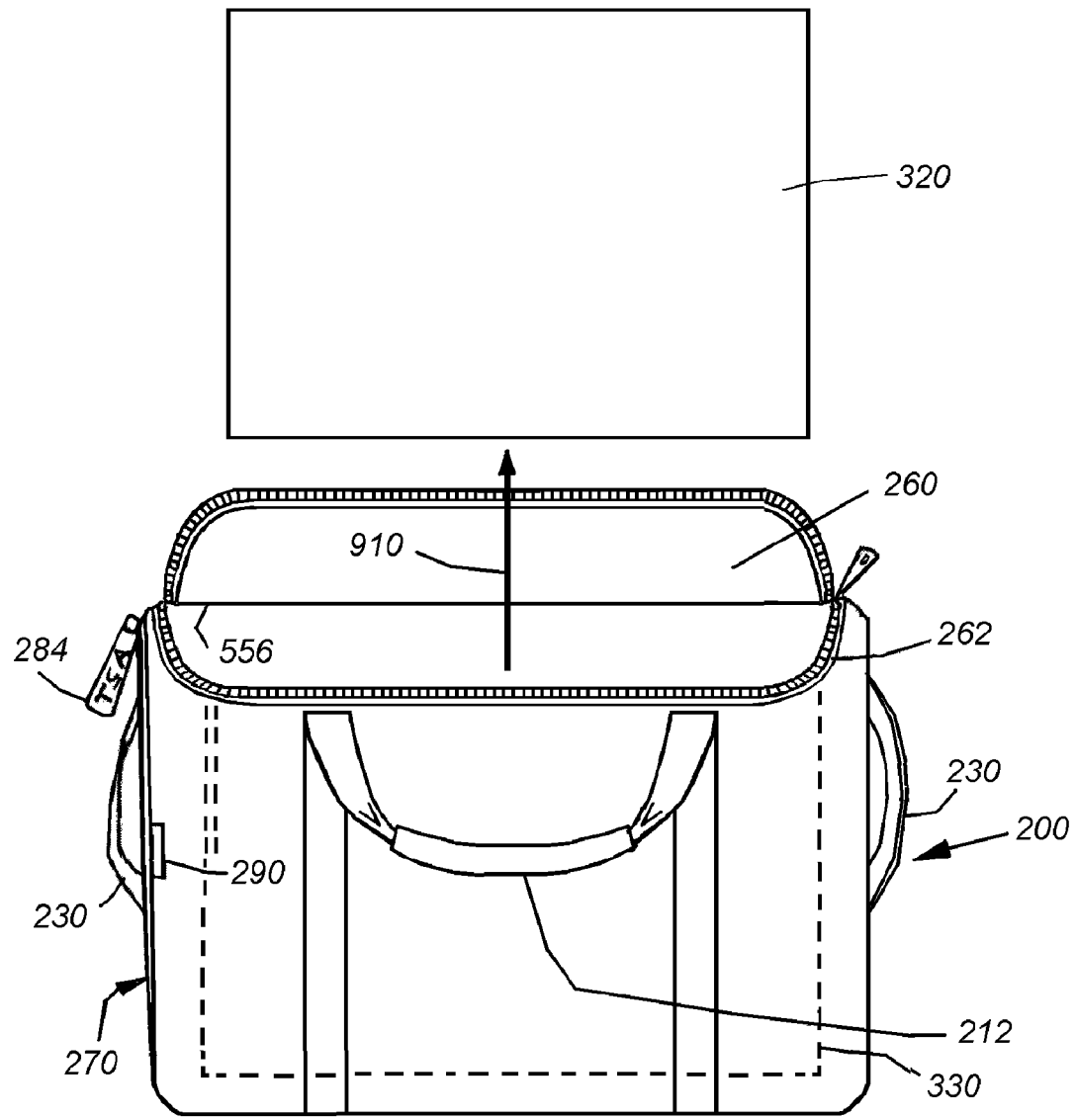
FIG. 9 is a front view of the case of FIG. 2 showing the laptop being withdrawn across the lipless edge of the tray and through the unzipped/opened top flap while the tray remains in place within the case enclosure.

The case 200 of this invention is also adapted to be used in a conventional manner with the laptop removable through a top flap 260 with a zipped closure 262. With further references to FIGS. 7 through 9, the storage and removal of the laptop 320 through the top flap 260 is shown in further detail. As shown particularly in FIG. 7, which displays a cross section of the case 200, the laptop 320 and tray 330 reside in a front compartment 720. The laptop 320 is enclosed by the compartment 720 on all sides during normal storage within the case. The front compartment 720 is separated by a padded center divider 730 to which the tether 430 is attached. The space defined by front compartment 720 is sufficient in thickness TFC to house the tray 330 and laptop 320 without substantial excess movement. The various panels of the compartments can include internal padding constructed from foam, fiber fill, or another resilient material. Where appropriate, stiffeners constructed from card stock or polymer sheet can also be provided within certain panels to increase their rigidity—such as internal file dividers. The exterior and interior surfaces of the various case panels can be coated or covered with a variety of material types. For example, the exterior surfaces of the case can be covered using a woven synthetic material, imitation leather and/or natural leather. The various interior surfaces of the panels can be covered using a woven or non-woven synthetic material, natural materials, and/or a polymer coating. As discussed above, and depicted in FIG. 7, the upper edge 556 of the tray 330 is free of any lip or raised wall. Thus, the top side edge 740 of the laptop is free to slide across this portion of the tray 330. Three edges 550, 552 and 554 should be sufficient to prevent substantial movement during the scanning process. This is particularly so, since the side edges 550 and 554 are generally disposed in the direction of travel through the scanner. Thus, front to back movement that maybe brought on by passing through the scanner opening (112 in FIGS. 1 and 6) is limited. That a separated rear compartment is also provided. This compartment can include any number of pockets, loops, and other business accessory folders according to various embodiments. In this embodiment, the rear compartment 760 is accessed through a top zipped closure 770 that can extend around three sides of the perimeter. The bottom sides of both compartment (sides 780 and 782 are unzipped and solid). Additional pockets or compartments can be provided against either the front face and/or the rear face 790 of the case 200. With reference more particularly to FIGS. 8 and 9, the laptop 320 is shown secured within the case 200 on the tray 330 (in phantom). The top flap 260, as well as the side flap 270, is fully closed. In FIG. 9, the flap 260 has been opened by moving the zip closure 262 to the opposite side. The user has grasped and withdrawn (arrow 910) the laptop 320 from the compartment by passing it over the upper edge 556 of the tray 330 (which does not contain a lip or other obstruction). Thus, despite the presence in the case of the novel side-removed tray 330, the laptop 320 is as easily accessed for normal use through the top opening as it would be for a conventional case.

With reference variously to FIGS. 2-9, the case 200 of this embodiment can also contain various indicia or other markings that facilitate easy recognition by security personnel of its status as an approved computer case in which the laptop need not be removed completely and placed in a separate bin. One possible indicia of the case's approval/special status is the use of a specific contrasting color and/or pattern on the side flap 270 and/or its surrounding region. In this embodiment the contrasting color and/or pattern is represented by dot-shading in FIG. 2. In one example, the overall case can be black, while the side flap region is a specific grey, red, orange, or another contrasting color that is accepted as an indicia by the regulatory agency (TSA, for example). In a further example, the side flap's zipper pull 284, and/or another zipper pull or fitting, can include a shape, color pattern and/or logo as shown to indicate an approved case. Likewise, a patch or logo can be applied at an appropriate location along a portion of the bag. In one example, the patch 290 is applied directly to the side of the bag (or another surface. In another embodiment, a web loop 290 is sewn into the middle of the corner seam or edge 280 between the front face 210 and the side flap 270. This loop 290 aids the user in withdrawing the laptop and tray from the opened side flap 270, as the user grasps the loop to stabilize the case while pulling upon the tray/laptop. The loop 290 can also be provided in a special color or pattern and can contain a predetermined logo 292. Any or all of these features can be used to quickly and obviously indicate an approved case to security personnel, thereby giving the user leave to carry out a security inspection process as shown generally in FIG. 6.

Figure 10:
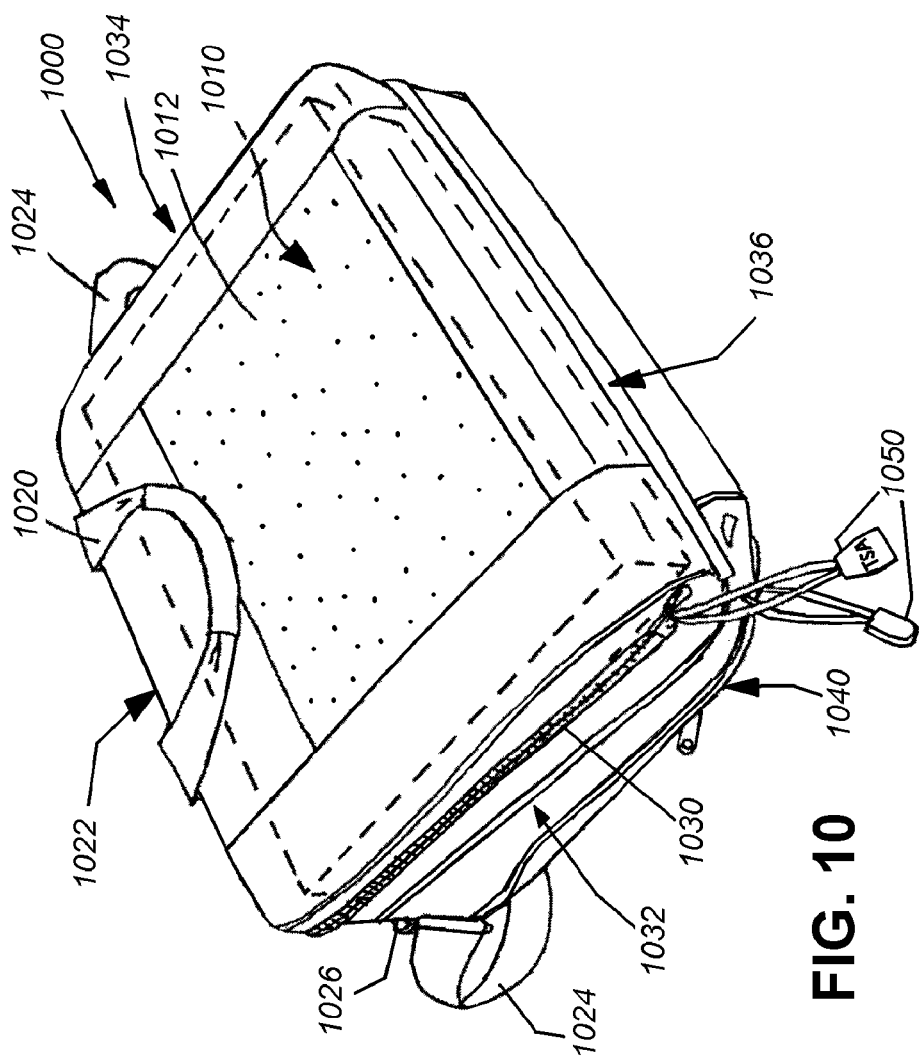
FIG. 10 is a perspective view of a computer case according to an alternate embodiment showing an exemplary laptop contained therein.

According to an alternate embodiment, a case 1000 is shown in FIG. 10. The case 1000, according to this embodiment is depicted in a closed orientation. Its front face 1010 includes an optional fabric loop 1012 adapted to slip over the retractable handle of a wheeled luggage piece of conventional design (not shown) so as to allow the case to piggyback on the luggage piece. The case 1000 includes a handle assembly 1020 at its top side 1022 for hand-carrying. In addition it can include an adjustable strap assembly 1024 with appropriate metal/plastic anchor fittings 1026. The case 1000 includes a peripheral zipper closure 1030 provided within the midsection of the lateral sides 1032, 1034 and top 1022. The case's bottom side 1036 that is not divided by the zipper 1030 or other closure, and acts as a fabric hinge for separating the front side 1010 and rear side 1040 of the case 1000. The peripheral zipper closure 1030 includes one or more zipper pulls 1050. In this embodiment, the pulls can include a regulatory-approval indicia as shown. A variety of other indicia (similar to those described for the embodiment of FIGS. 2-9) can be applied to the case of this embodiment. For example the fabric loop 1012 can be provided in a predetermined contrasting color (indicated by the dot-shading in FIG. 10) with respect to the surrounding fabric. While not shown, the case is constructed with foam or other resilient padding covered by a variety of materials or coatings (as described above). Certain panels may also contain stiffeners for added rigidity where appropriate.

Figure 11:
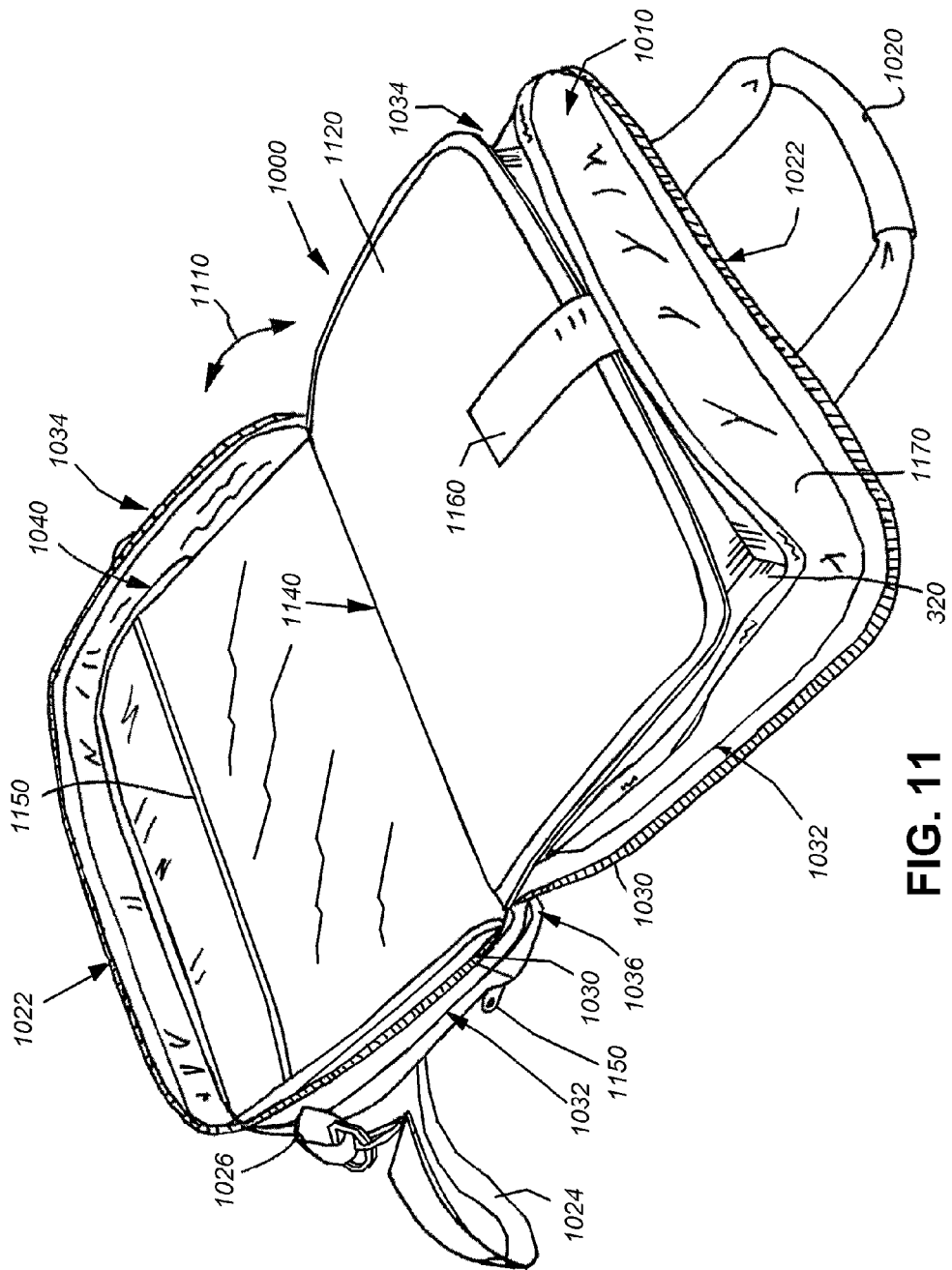
FIG. 11 is a perspective view of the case of FIG. 10 shown zipped open to reveal two clamshell case halves, one of which includes a laptop cushioned cover thereover.

As shown in FIG. 11, the zipped closure 1030 has been opened, and the two case sides 1010, 1040 have been hinged (double curved arrow 1110) about the resilient bottom side into a laid flat, fully opened orientation. This opening is in the manner of clamshell with a central hinge line 1140. In this orientation, the respective interior compartment of each side is revealed. The exemplary laptop computer 320 is secured beneath a padded center divider 1120. This divider can include a resilient foam filler covered with a synthetic fabric and hinged by a seam at the centerline 1140. The interior of the opposing side 1040 can include a separate sleeve or pocket 1150 (among other organizational structures, including pen loops, sleeves, etc.). In addition this side 1140 can include exterior pockets and other structures (see exterior pocket zipper pull 1150) that may or may not be x-ray-opaque. The divider 1120 is secured over the laptop 320 by a securing strap 1160 that can be attached by a snap, hook-and-loop fastener (as shown and described in FIG. 12 below) or other securing mechanism. Notably, the laptop 320 is surrounded on three exterior sides 1032, 1022, 1034 by a resilient, raised fabric lip 1170. The fabric lip 1170 can be filled with fibers or foam. Like the lips of the tray, the lip 1170 resists excursion of the laptop 320 out of the case compartment. In alternate embodiments, the lip 1170 can be constructed from a more rigid material and/or can contain stiffeners (not shown). In the present embodiment the lip can flex so that the laptop can be removed from the top side of the case without completely separating the two sides 1010, 1040. Rather, unzipping the region of the top side should be sufficient to allow a user to withdraw the laptop. In alternate embodiments, the lip can be modified to flex, so as to facilitate removal without the need to fully open both sides.

Figure 12:
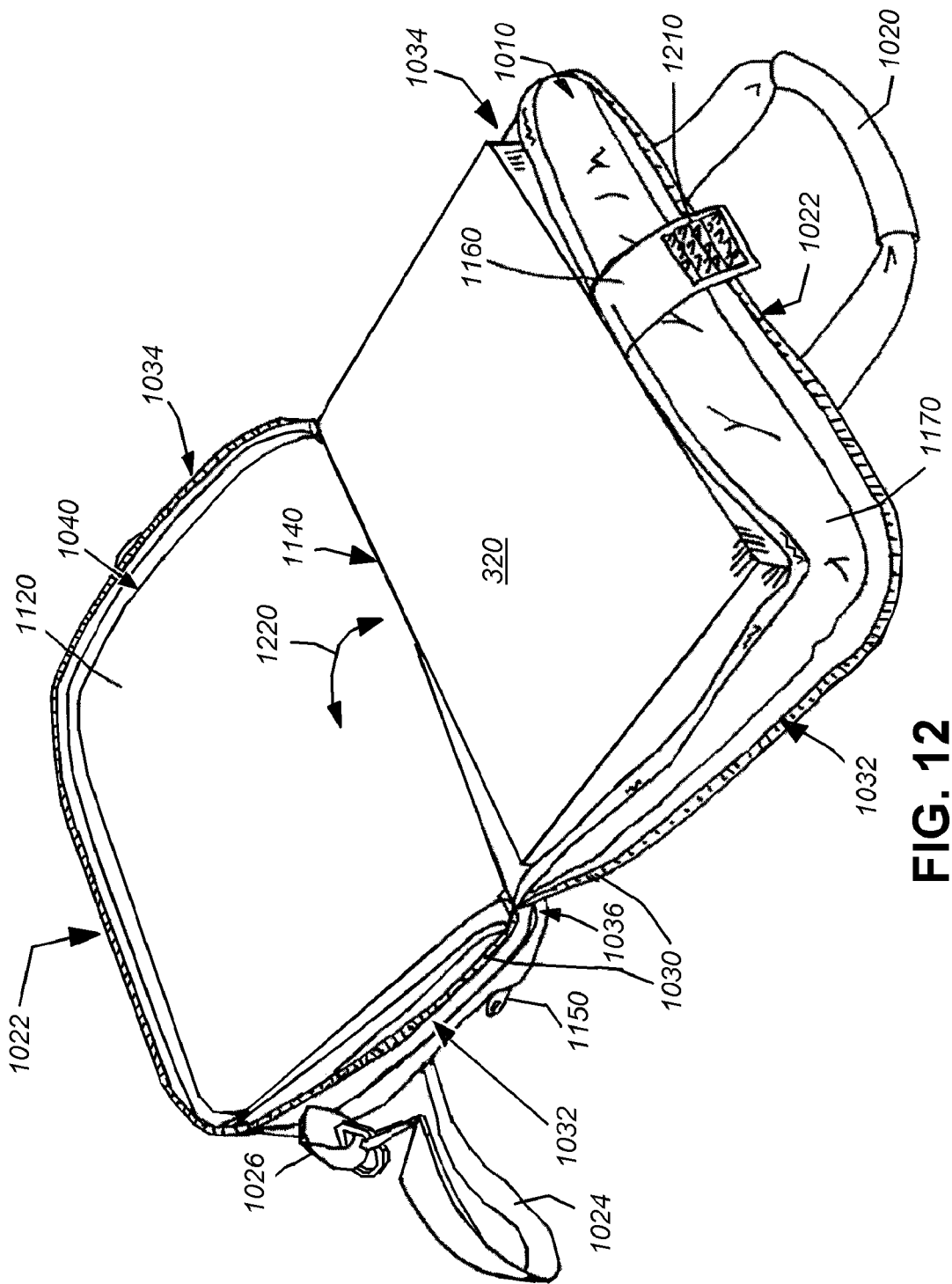
FIG. 12 is a perspective view of the case of FIG. 10 with the halves laid open and cushioned cover hinged back to reveal the laptop, now free of obstructions thereover.

With reference to FIG. 12, when the exemplary hook and loop fastener 1210 on the strap 1160 is removed from the mating piece on the divider 1120, the strap can be draped over the top side 1022 of the case as shown. The strap is, thus, no longer overlying the laptop 320 in any manner. The divider 1120 can then be hinged (double curved arrow 1220) to overlie the interior compartment of the opposing side 1140. Hence, the laptop is now fully exposed, but contained by the four edges (including the lip 1170) within the case side 1010. In this embodiment, there are no x-ray obscuring structures on the case side underlying the laptop (other than some x-ray transparent fabric pieces and seamed stitching) and this side is free of any pockets to store items or zipper pulls other than the optional pass-through loop of fabric 1012. Moreover, the zipper portion 1030 on the side 1010 is external of the case and can be constructed from a substantially x-ray-transparent plastic. Thus, the case 1000 of this embodiment generates a separate "tray" for the laptop that can satisfy the requirements of security screeners.

Figure 13:
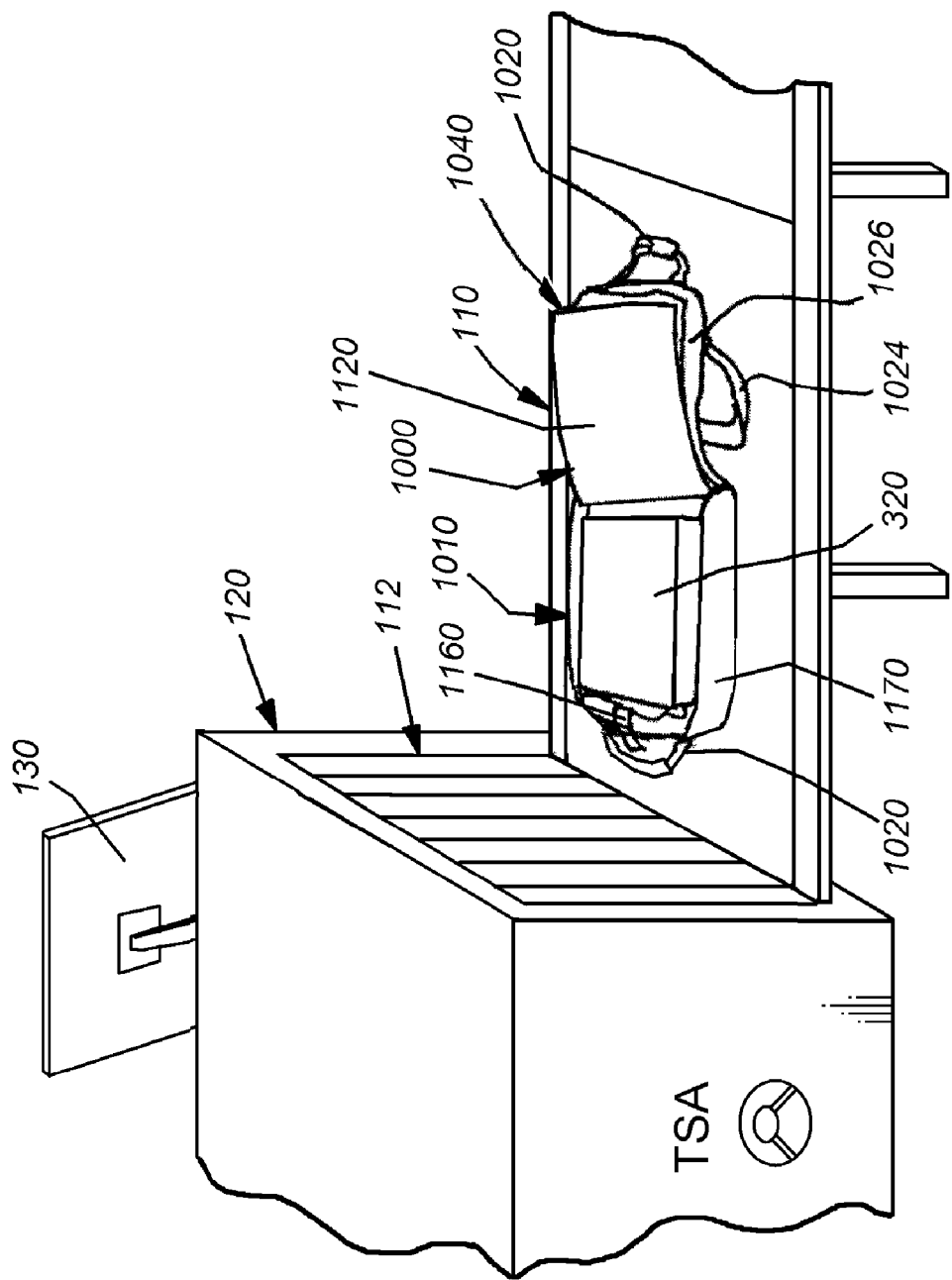
FIG. 13 is an illustration of the case of FIG. 10 being directed along the conveyor of an exemplary x-ray scanning system for scanning in a manner that is free of overlying obstructions and x-ray opaque case components.

Therefore, as shown in FIG. 13, the user has opened his or her case using the peripheral zipper closure 1030 and opened the case 1000, clamshell-style. The opened case 1000 has been laid open on the exemplary scanner conveyor 110 with the center divider 1120 and its securing strap 1160 placed in a non-overlying orientation with respect to the laptop. The laptop 320 is contained within the case side 1010 with the lip 1170 and bottom hinge area forming a "tray" that prevents the laptop from sliding out of the case, while still ensuring that the laptop is completely visible and will produce and obstruction free scan.

As described above, the term "case" as used herein should be taken broadly to include a variety of styles of laptop enclosure. FIGS. 14-18 detail a messenger bag-style case 1400 according to an alternate embodiment of the invention. The case 1400 is, in most respects, similar to the case 200 of the embodiment of FIG. 2. It includes at least one interior compartment (and optionally, two compartments) enclosed by a front and rear exterior face 1410, 1412, respectively and top, bottom and side faces 1414, 1416, 1418 and 1420, respectively. Notably, the top face 1414 also defines a movable cover flap 1430 that extends from a hinge corner 1432 at the top-rear edge of the case 1400 to a bottom flap edge 1434 residing near, but above, the bottom-front edge 1436 of the case 1400. While not shown, the flap 1430 can be secured to the underlying front face 1410 by any acceptable fastening system including, but not limited to, buckles, snaps and/or hook-and-loop fastener members. The arrangement of the flap 1430 with respect to the underlying bag in large part defines the messenger-bag style of this embodiment, which allows for a largely open top when the flap is pulled away (see FIG. 18 described below). A shoulder strap 1438, which may be adjustable in length, is secured to each of the opposing top side edges as shown. The flap top side 1414 resides between the strap ends.

Notably, the side face 1418 includes a side flap 1440 similar in construction to the above-described side flap 270 (FIG. 2). That is, it is hingedly secured along one edge 1442 to the body of the case 1400 and sealed by a three-sided zipper closure 1444. The zipper 1444 can be opened and closed by a pull 1446 that can include any of the above-described indicia indicating approval of the case 1400. Likewise, other indicia, such as printed loops, logo patches and/or dissimilar color or patterns can be applied as described generally above, and thereby indicate regulatory approval of the case 1400. The side flap 1440 is sized to allow passage therethrough of a conventional laptop as will be described below. Its width WMF and height HMF along the bag thickness is at least sufficient to fully expose the compartment containing the laptop and to allow it to be slid through the opening defined by the flap 1440 free of any interference or obstruction.

Figure 15:
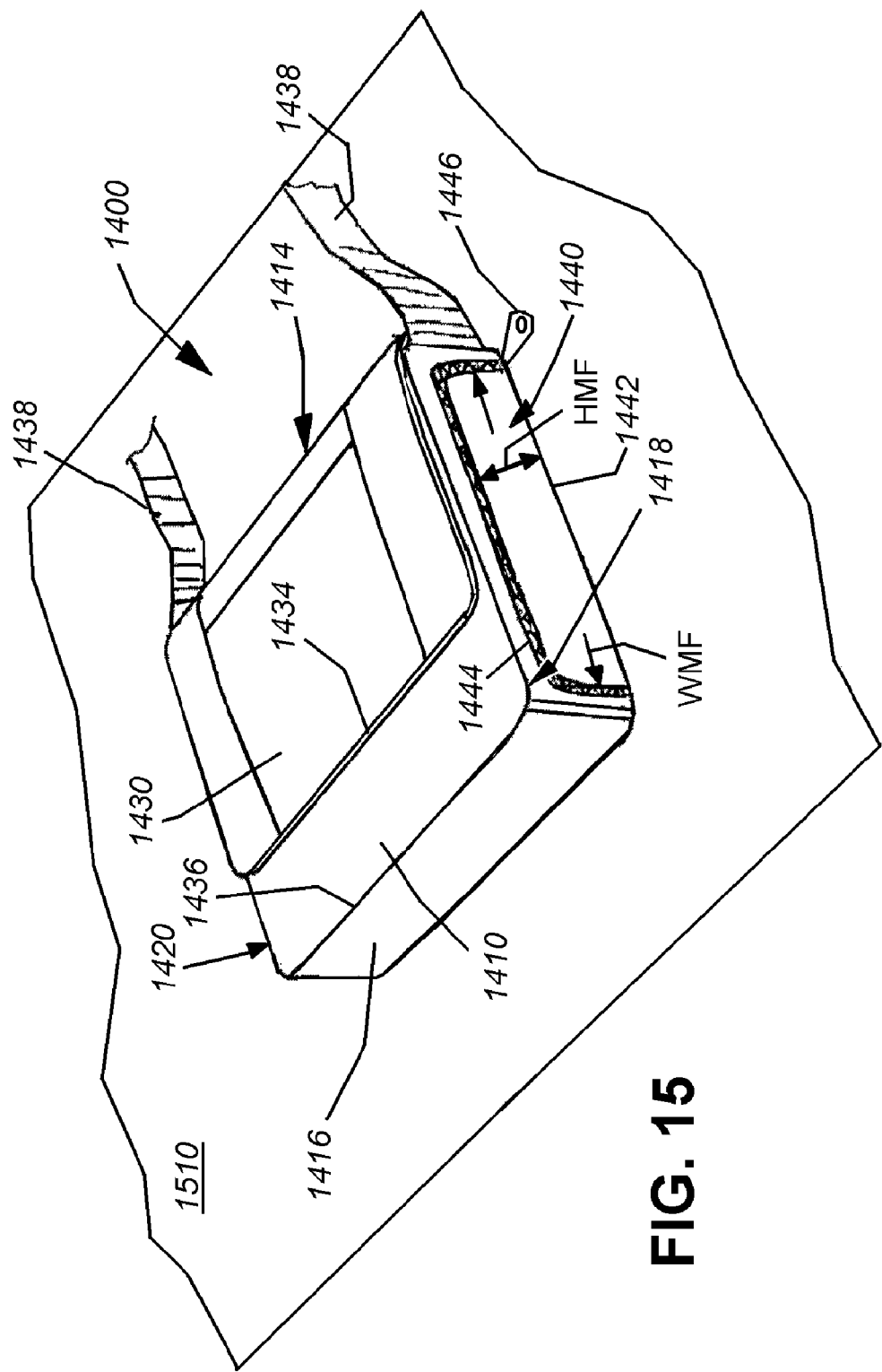
FIG. 15 is a perspective view of the messenger bag-style case of FIG. 14 placed on an exemplary security scanner conveyor with all flaps and closures in a closed orientation.

As shown, in FIG. 15, the case has been deposited on a conveyor 1510 of a conventional security checkpoint scanner (the same, or similar to, the conveyor 110 shown in FIG. 1), so that it can be inspected. The user has not yet opened the side flap 1440.

Figure 16:
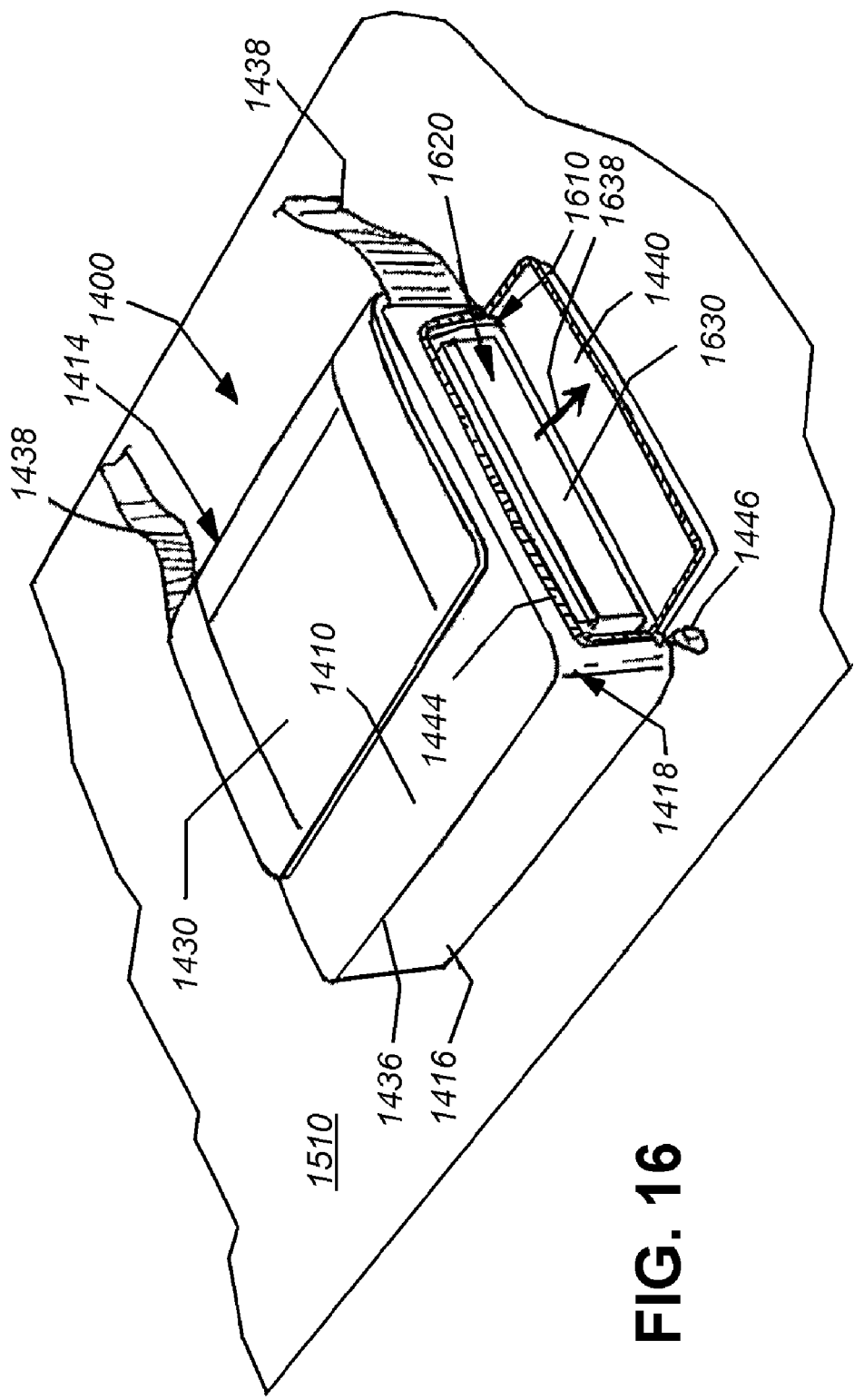
FIG. 16 is a perspective view of the messenger bag-style case of FIG. 14 placed on the exemplary security scanner conveyor of FIG. 15 with the side flap and closure in an opened orientation to reveal the pull-out tray for containing the laptop.
Figure 17:
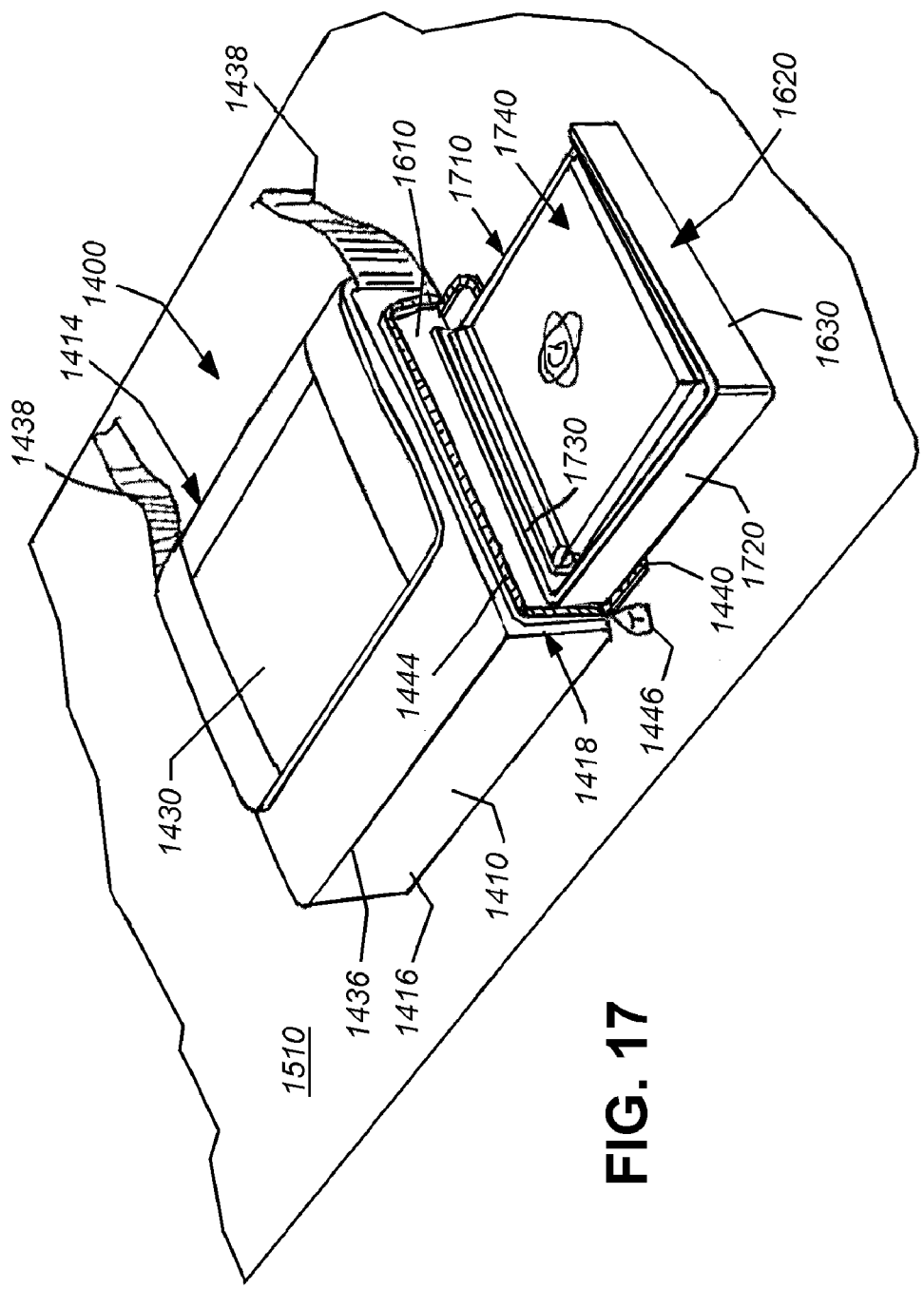
FIG. 17 is a perspective view of the messenger bag-style case of FIG. 14 placed on the exemplary security scanner conveyor of FIG. 15 showing the tray with laptop thereon in a fully withdrawn orientation for scanning.

Thus, as shown in FIG. 16, the zipper closure 1444 has been pulled away, and the side flap 1440 is hinged away to reveal the side opening 1610. The laptop tray 1620 is visible within the opening 1610. The user can grasp the lip 1630 and thereby withdraw (arrow 1638) the tray 1620 so that it is remote from the case body for unobstructed scanning and inspection. As shown in FIG. 17, the tray 1620 and enclosed laptop 1710 are moved to a remote location on the conveyor 1510. The tray can be tethered to a location within the interior of the case in the manner described above with respect to the case 200. Likewise the shape, size, and material composition of the tray can be similar to o the same as that of the tray 330 of the case 200. In the withdrawn orientation depicted in FIG. 17, the laptop is restrained by three adjoining lips 1630, 1720, 1730, with one edge 1730, which faces the top side of the bag free of a lip or other obstruction to allow the laptop to pass freely thereover when withdrawn normally.

Figure 18:
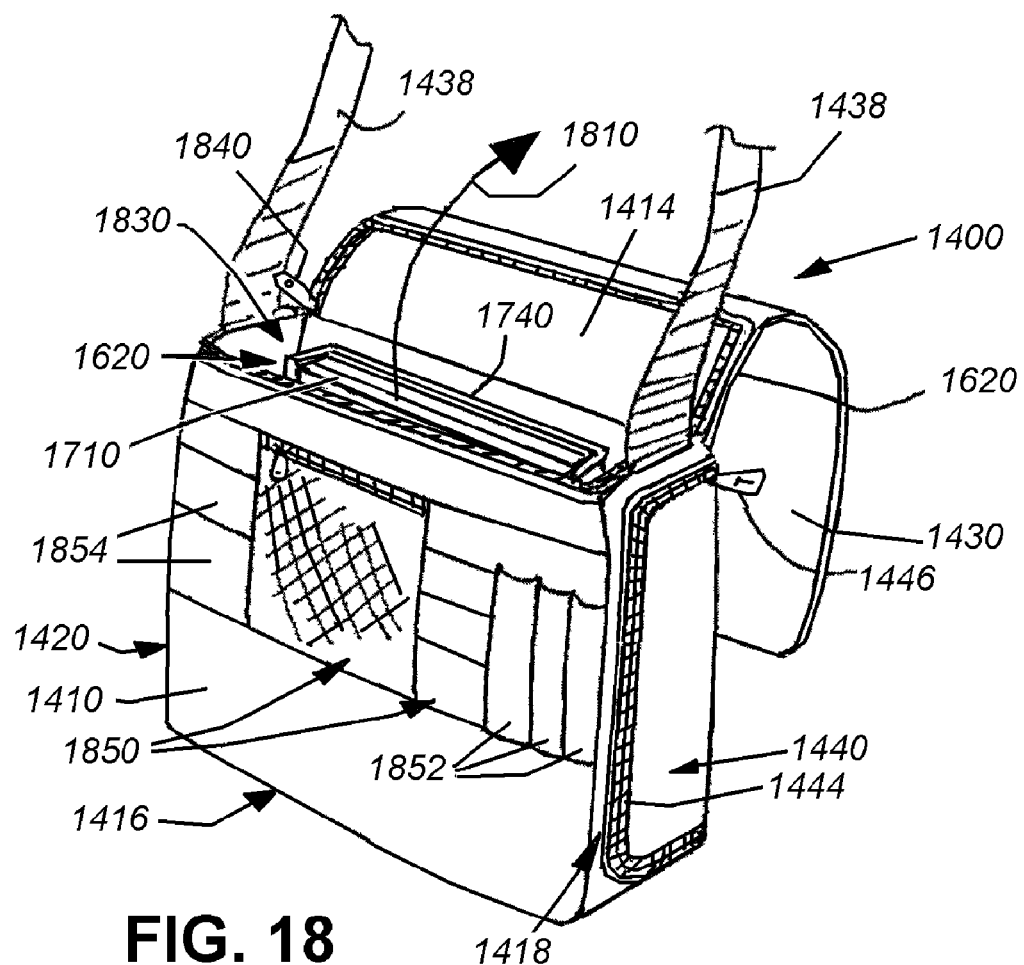
FIG. 18 is a perspective view of the messenger bag-style case of FIG. 14 showing the top flap of the bag in an opened orientation as to allow withdrawal of the enclosed laptop.
Figure 19:
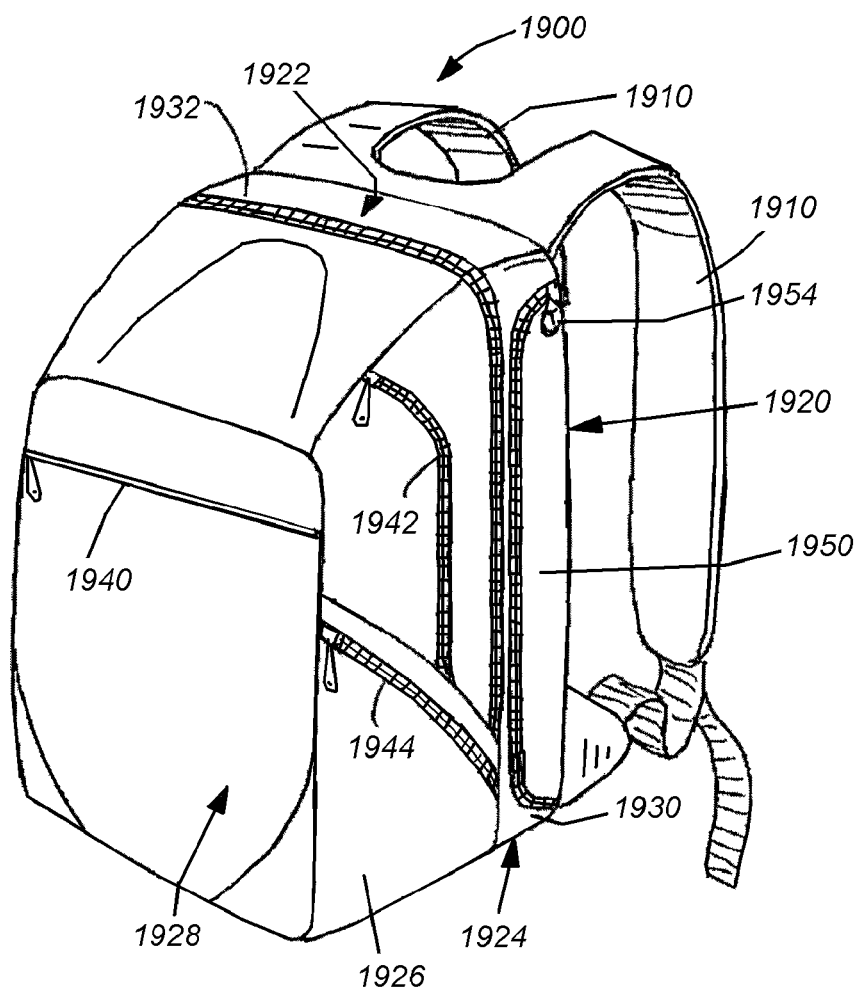
FIG. 19 is a perspective view of a backpack-style computer case showing a top pocket and a novel side pocket and pull-out tray according to another illustrative embodiment of this invention

In FIG. 18, the side flap 1440 is closed and secured by the zipper 1444, with the laptop 1710 and tray 1620 contained fully within the interior of the case 1400. The flap 1430 is hinged rearwardly (curved arrow 1810) as shown. In this embodiment, the top side 1414 is further secured by an optional top zipper closure 1820 (or other fastener assembly), which prevents inadvertent spillage of the laptop from the top opening 1830 if the overall flap 1430 is not secured to the case front side 1410. The pull 1840 of the top closure 1820 is accessed by partially hinging away the flap 1430, and then, after opening the zipper 1820, completely hinging away the flap 1430 and associated top side 1414 as shown. In this opened orientation, the user can grasp the laptop and slide it normally by withdrawing it over the unobstructed top tray edge 1740.

When the flap 1430 is hinged away as shown in FIG. 18, the front face 1410 of the case 1400 reveals a plurality of useful pockets 1850, pen/pencil holders 1852 and card carriers 1854—among other conventional business accessory holders that should be clear to those of ordinary skill. None of these pockets/holders, nor the items contained therein, overlie or obstruct scanning of the enclosed laptop when it is withdrawn on the tray as shown in FIG. 17.

Figure 14:
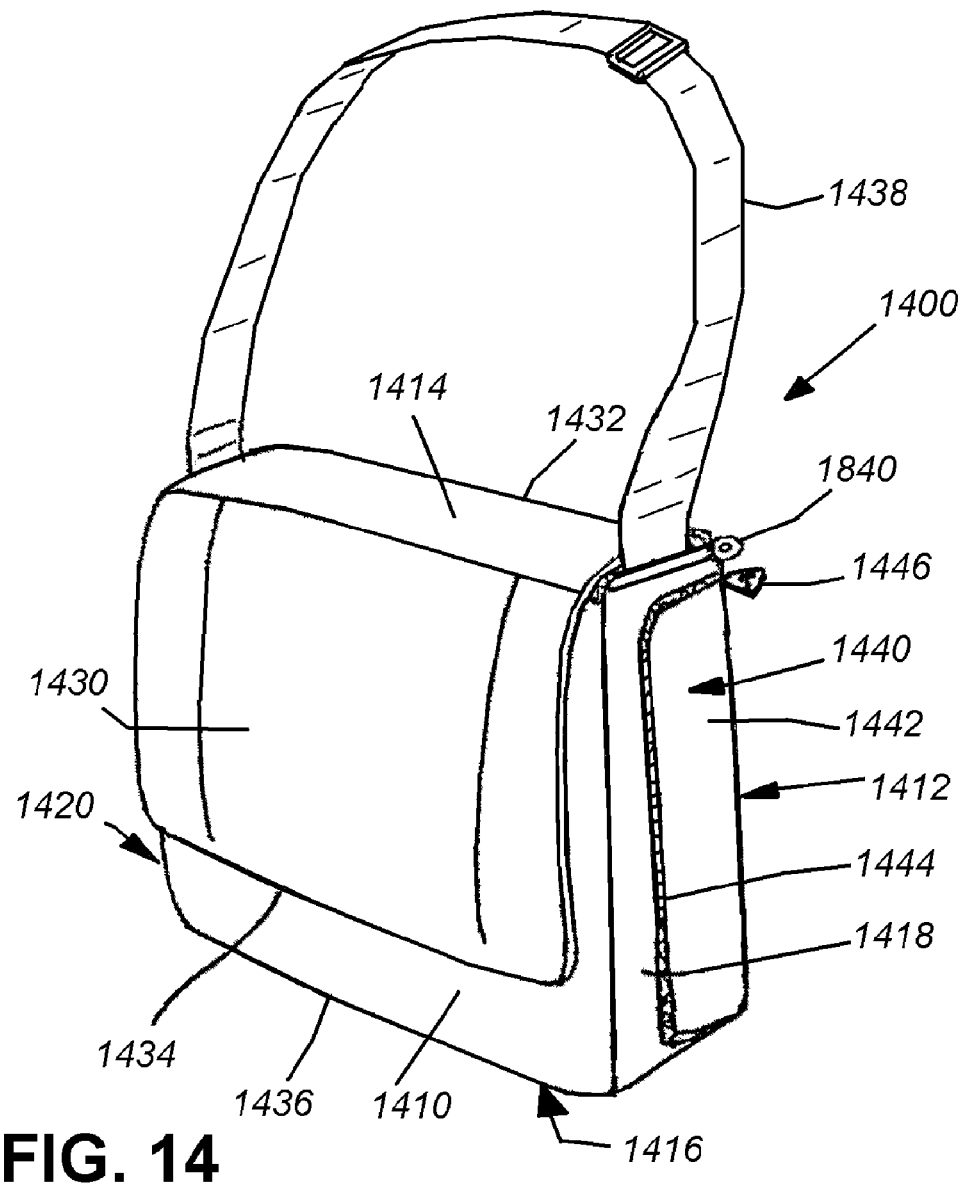
FIG. 14 is a perspective view of a messenger bag-style computer case showing a top pocket and a novel side pocket and pull-out tray according to another illustrative embodiment of this invention

Like the other embodiments shown and described herein, the interior and/or exterior surfaces of the messenger bag-style case 1400 of FIG. 14 can be constructed from a variety of synthetic and/or natural materials. Where desired sides of the case can be provided with appropriate stiffeners and/or padding. Separators between interior compartments an also be provided where appropriate. Likewise additional pockets, compartments and other ornamental and/or functional details can be provided to the case 1400 in further illustrative embodiments.

It is recognized that backpack-style computer cases have gained increasing popularity among students and professionals alike. FIGS. 19-23 detail a backpack-style computer case 1900 adapted for security checkpoint inspection of the enclosed laptop computer according to the teachings of this inventions. The backpack 1900 differs from the above-described shoulder and hand-carried cases in that it is designed mainly to be worn over both shoulders of the wearer using a pair of adjustable shoulder straps 1910 that are secured to the rear face 1920 adjacent to each of the top side 1922 and the bottom side 1924. Additional hand holds can be provided (not shown) using pieces of web material attached, for example, at the top face 1922. The backpack 1900 includes a thickened front section 1926 with a front face 1928. The front section is secured to a shallower rear section 1930 by a peripheral zipper closure 1932, extending along each side and the top, which allows the front section 1926 to be hinged away from the rear section 1930 about the bottom face. The backpack 1900 can be constructed from a variety of materials, in the manner of a conventional backpack, including synthetic and/or natural materials, padding, stiffeners and the like. In this example, the front section 1926 also includes a plurality of additional compartments and pockets that can be accessed by respective zipper closures 1940, 1942, and 1944. Other external and internal features and details can be provided to the backpack as appropriate.

Figure 20:
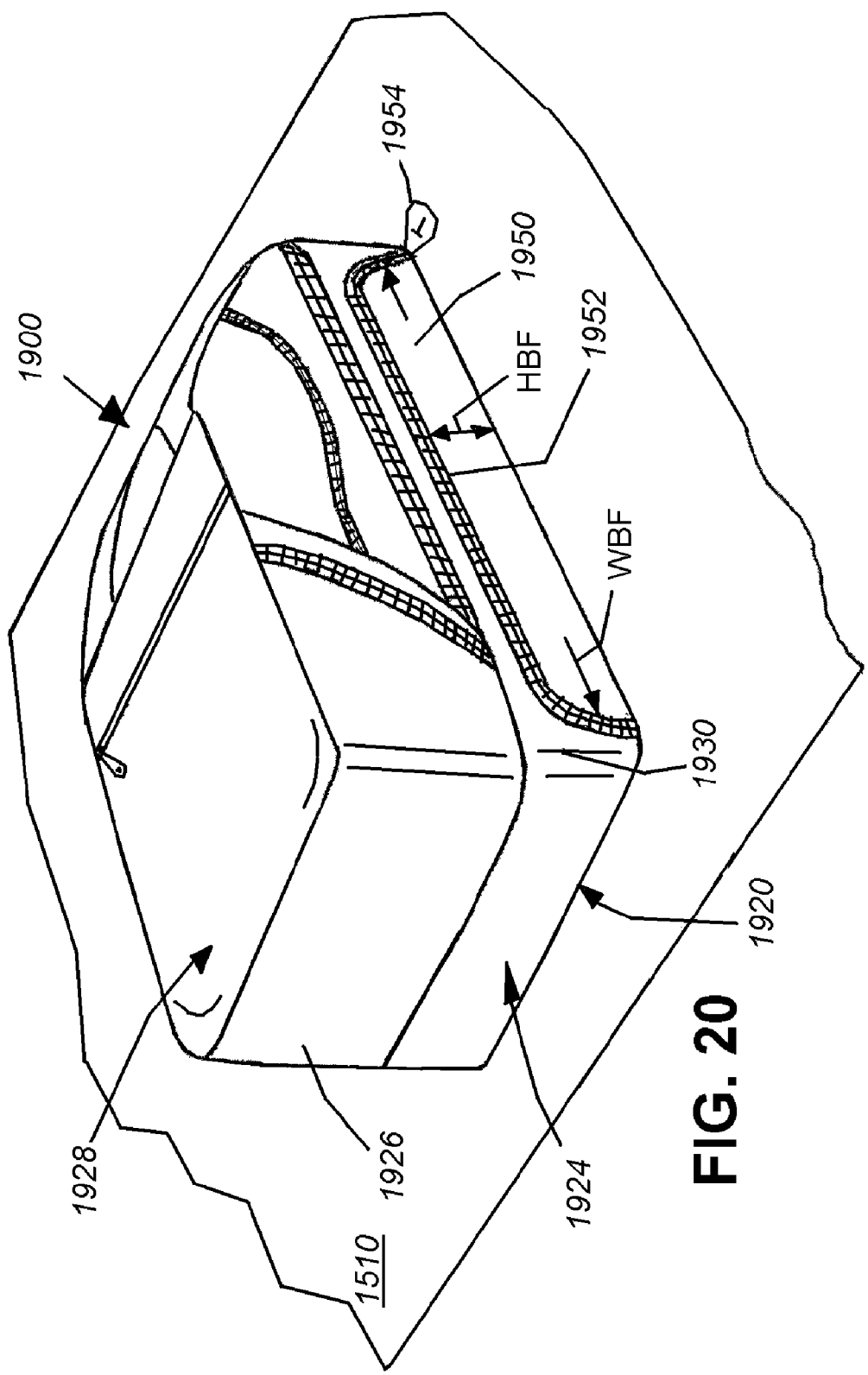
FIG. 20 is a perspective view of the backpack-style case of FIG. 19 placed on an exemplary security scanner conveyor with all flaps and closures in a closed orientation.

Notably, between the peripheral zipper closure 1932 and the rear face 1920 along side of the rear section 1930 is a side flap 1950 according to the teachings of this invention. The side flap 1950 provides access to a rear compartment that contains a withdrawable tray and laptop computer. It is accessed by a three-sided zipper closure 1952. In this embodiment, the laptop may be stored in the backpack 1900 so that its longer dimension is arranged from top-to-bottom. In this manner, the width of the backpack can be made narrower so as to conform to conventional backpack dimensions. Thus, the flap width WBF (FIG. 20) is slightly longer than the laptop's long dimension. The flap height HBF is similar to other flap heights (TF, HMF) described herein. With reference to FIG. 20, the backpack 1900 is deposited on the above described security checkpoint scanner conveyor 1510.

Figure 21:
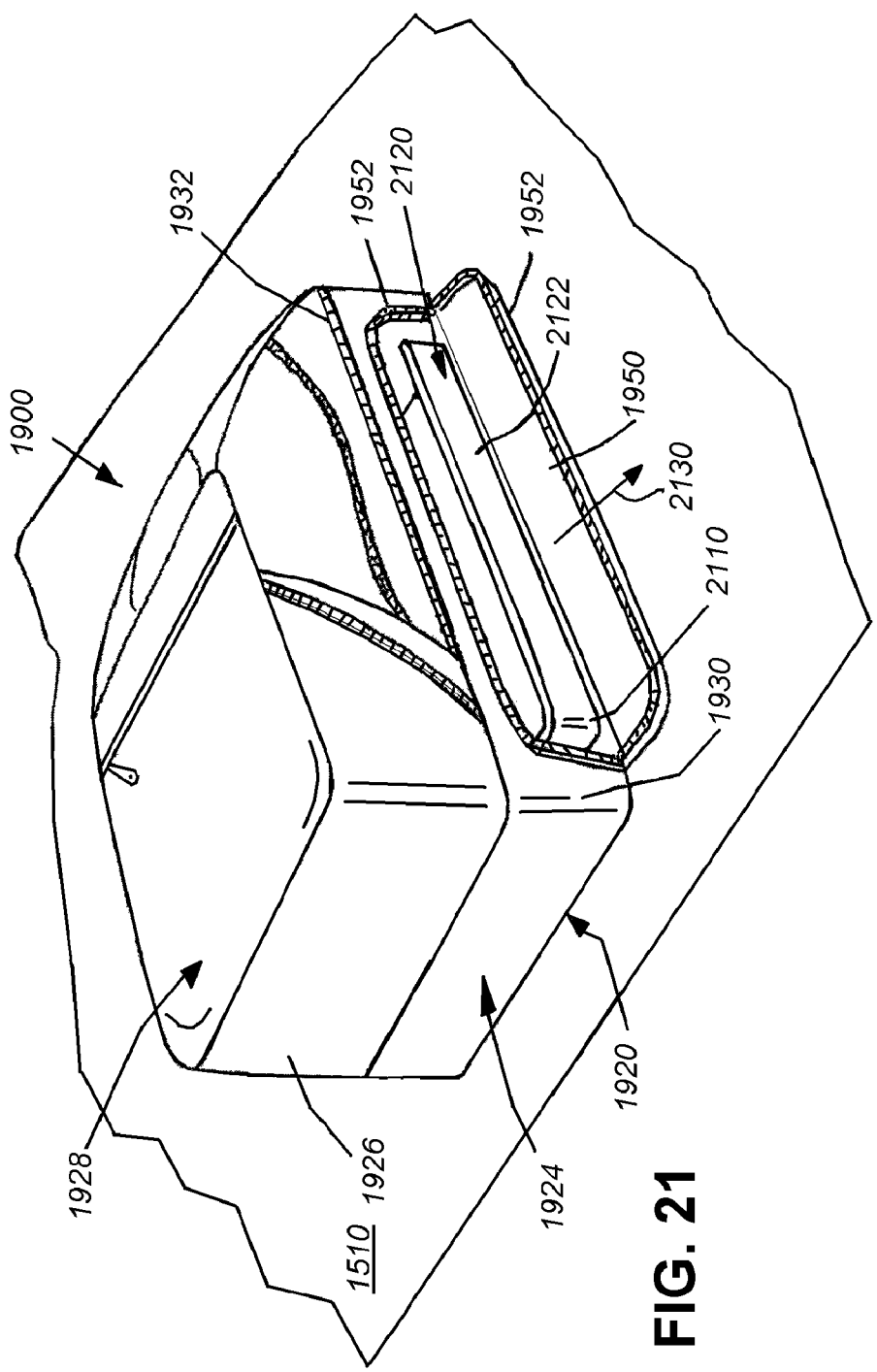
FIG. 21 is a perspective view of the backpack-style case of FIG. 19 placed on the exemplary security scanner conveyor of FIG. 20 with the side flap and closure in an opened orientation to reveal the pull-out tray for containing the laptop.
Figure 22:
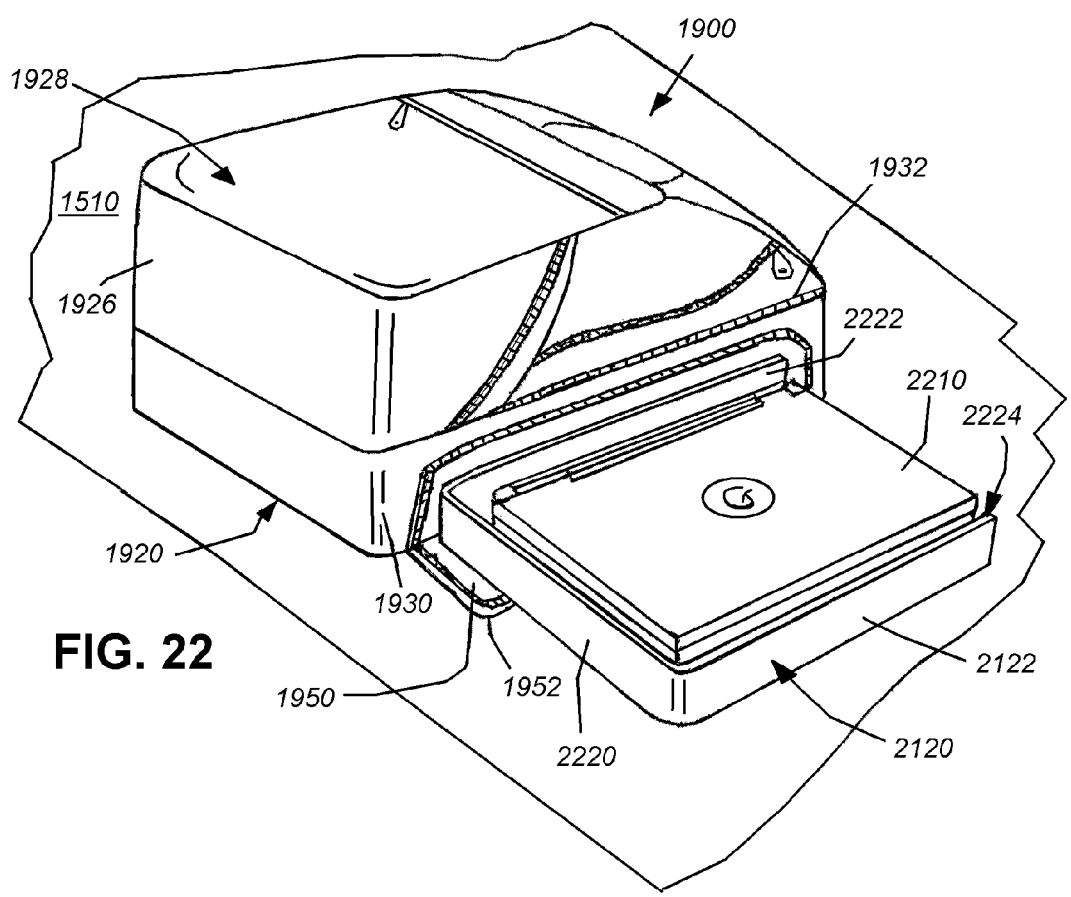
FIG. 22 is a perspective view of the backpack-style case of FIG. 19 placed on the exemplary security scanner conveyor of FIG. 20 showing the tray with laptop thereon in a fully withdrawn orientation for scanning.

As shown in FIG. 20, the backpack 1900 is deposited on a checkpoint conveyor 1510 by the user, resting it on its rear face 1920. At this time the flap 1950 is unopened. The user proceeds to open the flap 1950 as shown in FIG. 21, by unzipping the zipper 1952 using the pull 1954, and hinging the flap about the hinge line 2110 along the rear face 1920. This exposed the tray 2120, which can be grasped at the elongated lip 2120, and withdrawn (arrow 2130) into the fully exposed/withdrawn position as shown in FIG. 22. In the withdrawn position, the laptop 2210 contained in the tray 2120 is remote from any overlying or underlying structures of the backpack. A tether (not shown) attached to the interior side of the rear face 1920 can limit further extension of the tray beyond a predetermined location that is closely adjacent the side face of the backpack. After inspection, the tray and laptop can be returned to the compartment 1930 and the flap 1950 can be sealed by the zipper 1952 in a manner described generally above. As shown further in FIG. 22, the tray lip 2122 forms a continuous lip structure with an adjacent bottom lip and opposing side lip 2220 and 2222. These lips 2122, 2220, 2222 collectively enclose three sides of the laptop 2210. The top tray side 2224 remains substantially free of a lip to allow withdrawal of the laptop 2210 through the top of the tray as shown in FIG. 23.

Figure 23:
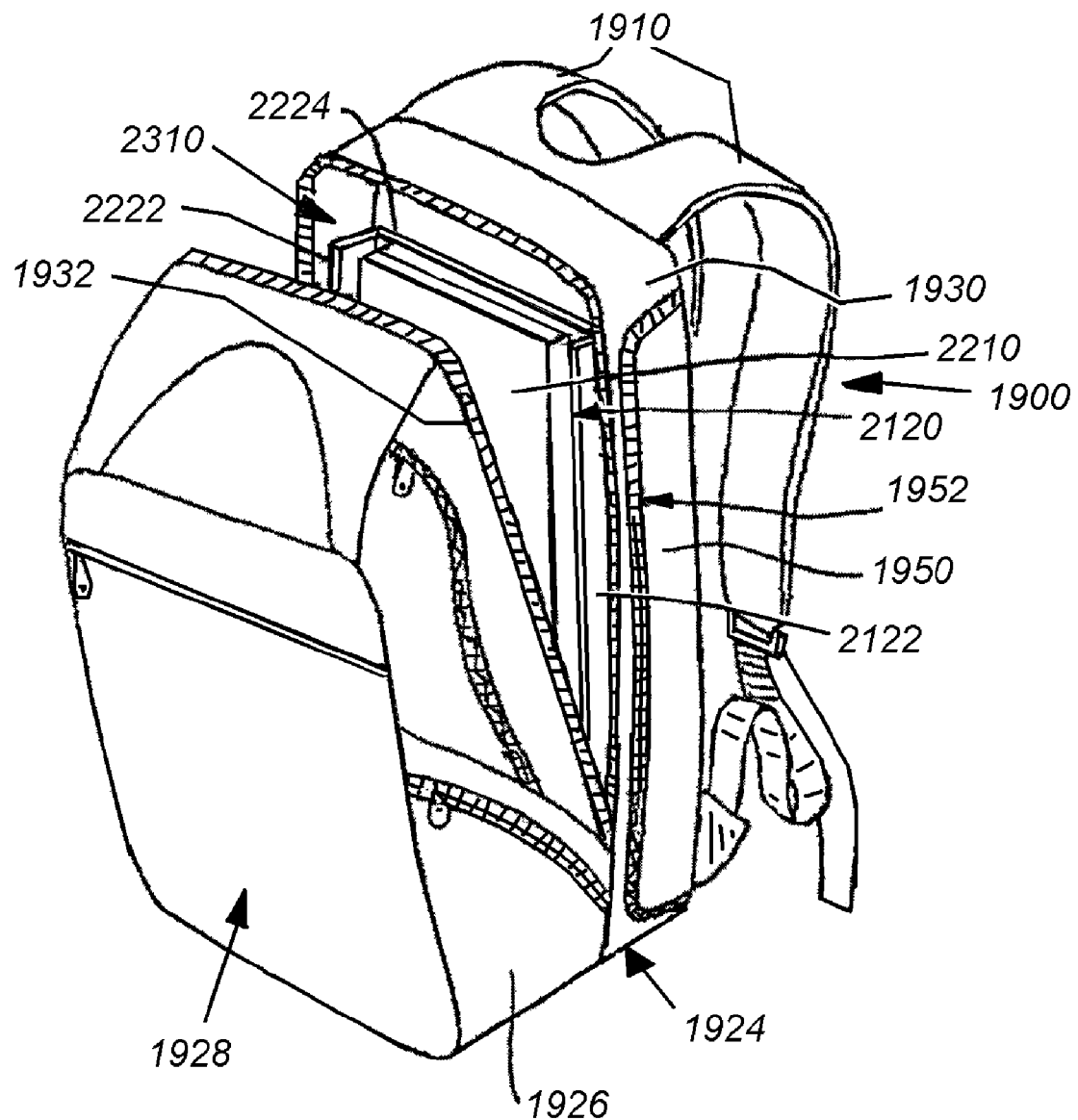
FIG. 23 is a perspective view of the backpack bag-style case of FIG. 19 showing the central closure of the bag in an opened orientation as to allow withdrawal of the enclosed laptop.

In FIG. 23, the tray 2120 has been returned to the rear compartment 1930, and the peripheral zipper 1932 has been opened to separate the front compartment 1926 from it, creating an opening on the top side opening 2310. Note that the front compartment can include a rear wall (not shown), which acts as a divider between compartments, and helps to secure the laptop in place in the tray when the zipper 1932 is closed. The wall can be appropriately padded. When the compartments are opened, the user can grasp the laptop 2210 and remove it through the top opening 2310 over the lip-free edge 2224 of the tray 2120. The laptop can be returned to the 1930 compartment by sliding it back through the top side opening 2310 and the compartments can be sealed together by securing the zipper closure 1932.

Note that the tray 2120 of this embodiment can be constructed similarly to other trays herein, except that the open edge 2224 is disposed along a shortened, rather than a lengthened side. Moreover, the backpack can include various indicia, including printed loops, unique pulls (for example, pull 1954), and/or dissimilar colors or patterns as described generally herein to indicate approval of the backpack 1900 by appropriate security authorities.

It should be clear that each of the above-described embodiments provides a computer case that effectively emulates the current requirement that the laptop be presented separately to the scanner from a case that overlies it, and that no x-ray opaque elements or components underlie the laptop. However unlike the use of completely separate and discrete baskets for housing the laptop and case according to a conventional scanning procedure, the above-described embodiments allow the associated laptop computer to remain in a connected member of the overall computer case. This connected member is particularly adapted to allow the laptop to be presented to the scanner with no overlying structures of any kind and no underlying structures that would obscure the scan of the laptop internals.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while the cases herein are adapted to enclose laptop computers, the principles herein are applicable to a variety of other electronic devices such as portable DVD players. Thus, the term "laptop", "laptop computer" and the like, as used herein should also be taken broadly to include a variety of electronic and non-electronic devices carried in cases that must be separated from the case for security checks. In addition, it is expressly contemplated that a wide variety of different indicia can be provided at selected locations on the case to indicate appropriate regulatory approval. These indicia may also vary from region to region or country to country. Alternately, the indicia recognized by of a plurality of independent (e.g. differing countries' or regions') security authorities can be applied to a single bag to aid the international traveler. Where the laptop is stored in a case according to the embodiment of FIGS. 10-13, it is contemplated that the center divider and its securing strap can be secured in an open, non-interfering position by supplemental fasteners or strapped so that they do not inadvertently pass back onto the laptop during the scanning process. It is further contemplated that design elements of each embodiment can be combined. For example a case having a peripheral zipper that allows clamshell-like opening of opposing sides can be combined with a tray that is removable through a secondary side flap and opening on one of the sides. Also, while zipper closures are used for the side flap and other closing structures in various embodiments, it is expressly contemplated that other closure systems, such as hook-and-loop fastener members, snaps and the like can be substituted in alternate embodiments. Moreover, while one side of the illustrative trays in this invention is fee of a lip or obstruction, such edges can include a shortened-height lip or other shoulder assembly that does not fully obstruct the passage of the laptop thereover, but still provided some restriction to laptop movement when laid flat for inspection. Likewise, the various lips of the laptop need not be continuous, but can be broken into segments or other divided structures. Accordingly, this description is meant to be taken only by way of example, and not to otherwise limit the scope of this invention.

What is claimed is:

1. A case for carrying a laptop computer comprising:
   a first compartment constructed and arranged to removably enclose the laptop computer on all sides thereof;
   an x-ray-transparent tray located within the first compartment having a raised lip along a plurality of tray edges that restrains the laptop from movement of a tray base plate that is bounded by the tray edges;
   a side flap defining a sealable side opening constructed and arranged so the tray and the laptop can be selectively withdrawn out of the enclosure into a fully exposed location aside the opening; and
   a sealable top opening constructed and arranged to allow the laptop to be withdrawn through the top opening.

2. The case as set forth in claim 1 wherein the tray includes an edge located adjacent to the top opening that is free of the raised lip so as to allow passage of the laptop thereover when withdrawn through the top opening.

3. The case as set forth in claim 2 further comprising a tether attached to the tray and the compartment that limits withdrawal of the tray beyond a predetermined gap distance with respect to an adjacent edge of the case.

4. The case as set forth in claim 3 wherein the case includes an indicia indicating regulatory approval of the case.

5. The case as set forth in claim 4 wherein the indicia comprises a dissimilar color or pattern applied on the side flap with respect to a surrounding portion of the case.

6. The case as set forth in claim 4 wherein the indicia comprises a fabric loop located adjacent to the side flap, the loop having at least one of a predetermined color, logo and symbol thereon.

7. The case as set forth in claim 6 wherein the indicia comprises at least one zipper pull having at least one of a predetermined color, logo and symbol thereon.

8. The case as set forth in claim 1 further comprising at least a second compartment located adjacent to the first compartment and separated therefrom by a divider on which the tray resides in the first compartment, the second compartment being accessed by a second compartment closure structure.

9. The case as set forth in claim 1 wherein the base plate includes raised structures.

10. The case as set forth in claim 1 wherein the first compartment comprises a rear backpack compartment including a rear face having backpack shoulder straps attached thereto and further comprising a front compartment, that is separable from the rear compartment by a closure therebetween.

11. The case as set forth in claim 10 wherein the front compartment includes a rear divider that divides the front compartment from the rear compartment.

12. The case as set forth in claim 10 wherein the tray defines a pair of longer sides and a pair of shorter sides, shorter than the longer sides, and the tray lip extends along each of the longer sides and a bottom side of the shorter sides.

13. The case as set forth in claim 1 further comprising a messenger bag flap that extends along a front face of the case and includes a top side that is removable secured to the top opening and hingedly attached to a top hinge edge at a top rear of the case.

14. The case as set forth in claim 13 further comprising a zipper enclosure that extends between opposing ends of the top hinge edge.

15. A case for carrying a laptop computer comprising:
a first compartment located adjacent to a front face of the case;
a second compartment located adjacent to a rear face of the case;
a divider located between the first compartment and the second compartment, the divider being hingedly attached to a bottom side of the case;
a peripheral closure structure extending along each of a pair of opposing lateral sides of the case and a top side of the case, located between the first compartment and the second compartment and extending between opposing ends of the bottom side, the peripheral closure being constructed and arranged to along the first side and the second side to hinge open about the bottom side to be laid flat in a fully opened orientation;
wherein the first compartment includes a flexible lip that extends around an edge of the first side between opposing corners of the bottom side, the lip constructed and arranged to retain the laptop in place when the first side and the second side are laid flat in the fully opened orientation; and
wherein the first compartment is free of any overlying obstructions, underlying pockets and x-ray-opaque structures that can obscure the laptop computer contained therein when the divider is hinged from the first compartment into the second compartment and the first side and the second side are laid flat in the fully opened orientation.

16. The case as set forth in claim 15 further comprising a securing strap mounted adjacent to the first compartment at a top edge thereof, the securing strap removably retaining the divider in a position overlying the first compartment, and being constructed and arranged to detach from the divider and extend away from the first compartment in a non-overlying orientation with respect thereto.

17. The case as set forth in claim 16 wherein an exterior surface of the first compartment includes a pass-through loop of material adapted to pass over a handle or a wheeled luggage piece.

\* \* \* \* \*